(12) United States Patent
Vadlamani et al.

(10) Patent No.: US 8,260,664 B2
(45) Date of Patent: *Sep. 4, 2012

(54) SEMANTIC ADVERTISING SELECTION FROM LATERAL CONCEPTS AND TOPICS

(75) Inventors: Viswanath Vadlamani, Redmond, WA (US); Abhinai Srivastava, Seattle, WA (US); Tarek Najm, Kirkland, WA (US); Munirathnam Srikanth, Redmond, WA (US); Phani Vaddadi, Issaquah, WA (US); Arungunram Chandrasekaran Surendran, Sammamish, WA (US); Rajeev Prasad, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/701,330

(22) Filed: Feb. 5, 2010

(65) Prior Publication Data

US 2011/0196737 A1   Aug. 11, 2011

(51) Int. Cl.
*G06Q 30/00* (2012.01)
*G05B 19/418* (2006.01)

(52) U.S. Cl. .............. 705/14.49; 707/738; 707/739
(58) Field of Classification Search .......... 707/738, 707/739
See application file for complete search history.

(56) References Cited

U.S. PATENT DOCUMENTS

| | | | |
|---|---|---|---|
| 5,835,087 A | 11/1998 | Herz et al. | |
| 6,038,560 A | 3/2000 | Wical | |
| 6,363,378 B1 | 3/2002 | Conklin et al. | |
| 6,460,034 B1 | 10/2002 | Wical | |
| 6,510,406 B1 | 1/2003 | Marchisio | |
| 6,567,805 B1 | 5/2003 | Johnson et al. | |
| 6,675,159 B1 | 1/2004 | Lin et al. | |
| 6,871,202 B2 | 3/2005 | Broder | |
| 7,089,226 B1 | 8/2006 | Dumais et al. | |
| 7,152,031 B1 | 12/2006 | Jensen et al. | |
| 7,153,137 B2 | 12/2006 | Altenhofen et al. | |
| 7,167,866 B2 | 1/2007 | Farnham | |
| 7,213,205 B1 | 5/2007 | Miwa et al | |
| 7,225,407 B2 | 5/2007 | Sommerer et al. | |
| 7,275,061 B1 | 9/2007 | Kon et al. | |
| 7,448,047 B2 | 11/2008 | Poole | |

(Continued)

FOREIGN PATENT DOCUMENTS

JP    2009252145    10/2009

(Continued)

OTHER PUBLICATIONS

"Filtering and Sorting in ADO.NET" , www.akadia.com. Feb. 12, 2004. pp. 1-10.*

(Continued)

*Primary Examiner* — Victoria Vanderhorst
(74) *Attorney, Agent, or Firm* — Shook, Hardy & Bacon L.L.P.

(57) ABSTRACT

Advertisements are selected for presentation on search result pages and web pages based on phrases generated from lateral concepts and topics identified for the search result pages and web pages. A search query or an indication of a web page is received for which advertisements are to be provided. Lateral concepts and topics are identified based on the search query or content of the web page. The lateral concepts and topics are used as phrases for selecting advertisements from an advertisement inventory. Selected advertisements are provided for presentation on a search results page in response to a search query or on a web page initially identified.

17 Claims, 12 Drawing Sheets

U.S. PATENT DOCUMENTS

| | | | |
|---|---|---|---|
| 7,496,830 | B2 | 2/2009 | Rubin et al. |
| 7,565,627 | B2 | 7/2009 | Brill et al. |
| 7,577,646 | B2 | 8/2009 | Chien |
| 7,668,813 | B2 | 2/2010 | Baeza-Yates |
| 7,707,201 | B2 | 4/2010 | Kapur et al. |
| 7,809,717 | B1 | 10/2010 | Hoeber et al. |
| 8,051,104 | B2 | 11/2011 | Weissman et al. |
| 2003/0078913 | A1 | 4/2003 | McGreevy |
| 2003/0177112 | A1 | 9/2003 | Gardner |
| 2003/0217052 | A1 | 11/2003 | Rubenczyk et al. |
| 2004/0003351 | A1 | 1/2004 | Sommerer et al. |
| 2004/0015483 | A1 | 1/2004 | Hogan |
| 2004/0030741 | A1 | 2/2004 | Wolton et al. |
| 2004/0169688 | A1 | 9/2004 | Burdick |
| 2005/0022114 | A1 | 1/2005 | Shanahan et al. |
| 2005/0055341 | A1* | 3/2005 | Haahr et al. ............... 707/3 |
| 2005/0080775 | A1 | 4/2005 | Colledge et al. |
| 2005/0125219 | A1 | 6/2005 | Dymetman et al. |
| 2005/0132297 | A1 | 6/2005 | Milic-Frayling et al. |
| 2005/0149510 | A1 | 7/2005 | Shafrir |
| 2006/0004732 | A1 | 1/2006 | Odom |
| 2006/0005156 | A1 | 1/2006 | Korpipaa et al. |
| 2006/0047691 | A1 | 3/2006 | Humphreys et al. |
| 2006/0069589 | A1 | 3/2006 | Nigam et al. |
| 2006/0069617 | A1 | 3/2006 | Milener |
| 2006/0106793 | A1 | 5/2006 | Liang |
| 2006/0116994 | A1 | 6/2006 | Jonker et al. |
| 2006/0117002 | A1 | 6/2006 | Swen |
| 2006/0242147 | A1* | 10/2006 | Gehrking et al. ............ 707/7 |
| 2006/0287919 | A1* | 12/2006 | Rubens et al. ............ 705/14 |
| 2006/0287983 | A1 | 12/2006 | Krauss et al. |
| 2007/0094256 | A1 | 4/2007 | Hite et al. |
| 2007/0174255 | A1 | 7/2007 | Sravanapudi |
| 2007/0226198 | A1 | 9/2007 | Kapur |
| 2007/0294200 | A1 | 12/2007 | Au |
| 2008/0033932 | A1 | 2/2008 | DeLong et al. |
| 2008/0059508 | A1 | 3/2008 | Lu et al. |
| 2008/0104061 | A1 | 5/2008 | Rezaei |
| 2008/0104071 | A1 | 5/2008 | Pragada et al. |
| 2008/0133585 | A1 | 6/2008 | Vogel et al. |
| 2008/0235203 | A1 | 9/2008 | Case et al. |
| 2008/0243799 | A1 | 10/2008 | Rozich |
| 2008/0256061 | A1 | 10/2008 | Chang et al. |
| 2008/0270384 | A1 | 10/2008 | Tak |
| 2008/0288456 | A1 | 11/2008 | Omoigui |
| 2009/0006358 | A1 | 1/2009 | Morris |
| 2009/0006974 | A1 | 1/2009 | Harinarayan |
| 2009/0024962 | A1 | 1/2009 | Gotz |
| 2009/0083261 | A1 | 3/2009 | Nagano et al. |
| 2009/0119261 | A1* | 5/2009 | Ismalon ............... 707/3 |
| 2009/0125505 | A1 | 5/2009 | Bhalotia |
| 2009/0157419 | A1 | 6/2009 | Bursey |
| 2009/0157676 | A1 | 6/2009 | Shanbhag |
| 2009/0164441 | A1 | 6/2009 | Cheyer |
| 2009/0234814 | A1 | 9/2009 | Boerries et al. |
| 2009/0240672 | A1 | 9/2009 | Costello |
| 2009/0241065 | A1 | 9/2009 | Costello |
| 2009/0254574 | A1 | 10/2009 | De et al. |
| 2010/0023508 | A1 | 1/2010 | Zeng et al. |
| 2010/0049682 | A1 | 2/2010 | Chow et al. |
| 2010/0106485 | A1 | 4/2010 | Lu |
| 2010/0131085 | A1* | 5/2010 | Steelberg et al. ............ 700/94 |

FOREIGN PATENT DOCUMENTS

| | | |
|---|---|---|
| KR | 10-0837751 | 6/2008 |
| WO | WO 01-50330 | 7/2001 |
| WO | WO2006083684 | 8/2006 |
| WO | WO2007113546 | 10/2007 |
| WO | WO 2007143109 | 12/2007 |
| WO | WO2008027503 | 3/2008 |
| WO | 2009117273 A2 | 9/2009 |
| WO | WO 2010148419 | 12/2010 |

OTHER PUBLICATIONS

"A semantic approach to contextual advertising". Broder, A.; Fontoura, M.; Josifovski, V.; Riedel, L. ACM, New York, NY. 2007. Page Nos. 559-66.*

Batko, Michal, et al., On Scalability of the Similarity Search in the World of Peers—Published Date: 2006 http://www.nmis.isti.cnr.it/falchi/publications/Falchi-2006-Infoscale.pdf.

Volnyansky, Ilya, Curse of Dimensionality in the Application of Pivot-based Indexes to the Similarity Search Problem—Published Date: May 2009. http://arxiv.org/PS_cache/arxiv/pdf/0905/0905.2141v1.pdf.

Broder, Andrei, et al., A Semantic Approach to Contextual Advertising—Published Date: Jul. 23-27, 2007 http://fontoura.org/papers/semsyn.pdf.

Osinski, Stanislaw, An Algorithm for Clustering of Web Search Results—Published Date: Jun. 2003 http://project.carrot2.org/publications/osinski-2003-lingo.pdf.

Rajaraman, Anand, Kosmix: Exploring the Deep Web using Taxonomies and Categorization—Published Date: 2009. ftp://ftp.research.microsoft.com/pub/debull/A09June/anand_deepweb1.pdf.

Wang, Xuerui, et al., A Search-based Method for Forecasting Ad Impression in Contextual Advertising—Published Date: Apr. 20-24, 2009 http://www.cs.umass.edu/~xuerui/papers/forecasting_www2009.pdf.

Wartena, Christian, et al., Topic Detection by Clustering Keywords—Published Date: Sep. 5, 2008 http://www.uni-weimar.de/medien/webis/research/workshopseries/tir-08/proceedings/18_paper_655.pdf.

Chirita, Paul-Alexandru, et al., Personalized Query Expansion for the Web—Published Date: Jul. 27, 2007 http://delivery.acm.org/10.1145/1280000/1277746/p7-chirita.pdf?key1=1277746&key2=8684409521&coll=GUIDE&dl=GUIDE&CFID=63203797&CFTOKEN=28379565.

Kules, Bill, et al., Categorizing Web Search Results into Meaningful and Stable Categories Using Fast-Feature Techniques—Published Date: Jun. 15, 2006 http://hcil.cs.umd.edu/trs/2006-15/2006-15.pdf.

Bade, Korinna, et al., CARSA—An Architecture for the Development of Context Adaptive Retrieval Systems—Published Date: Feb. 14, 2006 http://www.springerlink.com/content/jk3wj13251rh6581/fulltext.pdf.

Non Final Office Action in U.S. Appl. No. 12/727,836, mailed Jan. 6, 2012.

Non Final Office Action in U.S. Appl. No. 12/700,980 mailed Nov. 25, 2011.

Budanitsky, et al., "Semantics Distance in Wordnet: an experimental, application-oriented evaluation of five measures" workshop of wordnet and other lexical resources, in the north american chapter of the association for computation linguistics, Jun. 2001, Pittsburgh, PA http://citeseer.ist.psu.edu/budanitsky01semantic.html.

Cuil—Features, Cuil, Inc., Published 2010, http://www.cuil.com/info/features.

Fisher, Brian, et al., "CZWeb: Fish-Eye Views for Visualizing the World-Wide Web", Published 1997, 5 pages, http://scholar.google.co.in/scholar?cluster=3988401955906218135&hl=en&as_sdt=2000.

Gjergji Kasneci, "Searching and Ranking in Entity-Relationship Graphs"—Published Date: Dec. 23, 2009, http://domino.mpi-inf.mpg.de/intranet/ag5/ag5publ.nsf/6a06bf33407d587ec12565dd006fb8de/2c25044ad8d088fdc125763b003d5810/$FILE/gjergji_kasneci_phd.pdf.

Gjergji Kasneci, et al., "NAGA: Searching and Ranking Knowledge"—Published Date: Mar. 2007, http://www.mpi-inf.mpg.de/~ramanath/nagatr.pdf.

Gonen, Bilal, "Semantic Browser", Aug. 2006, 42 pages, University of Georgia, Athens, Georgia, http://citeseerx.ist.psu.edu/viewdoc/download?doi=10.1.1.83.9132&rep=rep1&type=pdf.

Google Wonder Wheel, Google Wonder Wheel Explained, Google Inc., Published 2009, http://www.googlewonderwheel.com.

Hao Liang, et al., "Translating Query for Deep Web Using Ontology", 2008 International Conference on Computer Science and Software Engineering, IEEE Computer Society, Published Date: 2008, http://ieeexplore.ieee.org/stamp/stamp.jsp?arnumber=04722650.

Havre, Susan, et al., "Interactive Visualization of Multiple Query Results," 2001, 8 pages, http://citeseerx.ist.psu.edu/viewdoc/download?doi=10.1.1.91.2850&rep=rep1&type=pdf.

Hearst, Marti A., "Ch. 10, Information Visualization for Search Interfaces", 2009, 65 pages, Search User Interfaces, http://searchuserinterfaces.com/book/sui_ch10_visualization.html.

International Search Report and Written Opinion PCT/US2011/021596, mailed Aug. 29, 2011.

International Search Report and Written Opinion PCT/US2011/021597, mailed Sep. 23, 2011.

Jonker, David, et al., "Information Triage with TRIST", May 2005, 6 pages, 2005 Intelligence Analysis Conference, Washington DC, Oculus Info, Inc., http://www.oculusinfo.com/papers/Oculus_TRIST_Final_Distrib.pdf.

Kiryakov, et al., "Semantic Annotation, Indexing, and Retrieval" Web Semantics: Science, Services and Agents on the World Wide Web, Elsevier, vol. 2, No. 1, Dec. 1, 2004, pp. 49-79.

Kosara, Robert, et al., "An Interaction View on Information Visualization", 2003, 15 pages, The Eurographics Association, http://www.cs.uta.fi/~jt68641/infoviz/An_Interaction_View_on_Information_Visualization.pdf.

Kosmix: Your Guide to the Web, Kosmix Corporation, Published 2010, http://www.kosmix.com/corp/about.

International Search Report and Written Opinion PCT/US2011/020908, mailed Sep. 28, 2011.

Leopold, Jennifer, et al., "A Generic, Functionally Comprehensive Approach to Maintaining an Ontology as a Relational Database", 2009, pp. 369-379, World Academy of Science, vol. 52, http://www.akademik.unsri.ac.id/download/journal/files/waset/v52-58-oaj-unsri.pdf.

Mateevitsi, Victor, et al., "Sparklers: An Interactive Visualization and Implementation of the Netflix recommandation algorithm", retrieved Apr. 7, 2010, 5 pages, http://www.vmateevitsi.com/bloptop/.

Nguyen, Tien N., "A Novel Visualization Model for Web Search Results," Sep./Oct. 2006, pp. 981-988, IEEE Transactions on Visualization and Computer Graphics, vol. 12, No. 5, http://ieeexplore.ieee.org/stamp/stamp.jsp?tp=&arnumber=4015455.

Non Final Office Action in U.S. Appl. No. 12/700,985 mailed Dec. 12, 2011.

Search Report PCT/US2011/0212 mailed Aug. 19, 2011.

Zoltan Gyongyi, et al., "Questioning Yahoo! Answers"—Published Date: Apr. 22, 2008, http://infolab.stanford.edu/~zoltan/publications/gyongyi2008questioning.pdf.

Roberts, Jonathan C., et al.,"Visual Bracketing for Web Search Result Visualization", 2003, 6 pages, Seventh International Conference on Information Visualization, IEEE Computer Society,http://ieeexplore.ieee.org/stamp/stamp.jsp?tp=&arnumber=1217989.

Smith, Kate A., et al., "Web Page Clustering using a Self-Organizing Map of User Navigation Patterns", Published 2003, pp. 245-256, Decision Support Systems, vol. 35, Elsevier Science, http://citeseerx.ist.psu.edu/viewdoc/download?doi=10.1.1.4.5185&rep=rep1&type=pdf.

Smith, Michael P., et al., "Providing a User Customisable Tool for Software Visualisation at Runtime," Published 2004, 6 pages, University of Durham, United Kingdom, http://citeseerx.ist.psu.edu/viewdoc/download?doi=10.1.1.60.4013&rep=rep1&type=pdf.

Thomas Strang, Claudia Linnhoff-Popien, and Korbinian Frank, "CoOL: A Context Ontology Languageto enable Contextual Interoperability", IFIP International Federation for Information Processing, Published Date: 2003, http://citeseerx.ist.psu.edu/viewdoc/download;jsessionid=BC65BEE5025FB518404AF16988E46489?doi=10.1.1.5.9505&rep=rep1&type=pdf.

Tony Veale and Yanfen Hao, "A context-sensitive framework for lexical ontologies", The Knowledge Engineering Review, vol. 23:1, 101-115, Cambridge University Press, Published Date: 2007, United Kingdom, http://afflatus.ucd.ie/Papers/ContextAndLexicalOntologies.pdf.

Tvarozek, Michal, et a., "Improving Semantic Search via Integrated Personalized Faceted and Visual Graph Navigation", Published Date: 2008, 12 pages, http://www2.fiit.stuba.sk/~bielik/publ/abstracts/2008/sofsem2008navigation.pdf.

U.S. Department of Transportation, Federal Aviation Administration, "The Effect of Loading Parameters on Fatigue of Composite Laminates: Part IV Information Systems"—Published Date: Dec. 2000, http://www.tc.faa.gov/its/worldpac/techrpt/ar00-48.pdf.

Yngve, Gary, "Visualization for Biological Models, Simulation, and Ontologies", Published Aug. 2007, 152 pages, University of Washington, http://sigpubs.biostr.washington.edu/archive/00000232/01/gary-thesis-final.pdf.

Final Office Action in U.S. Appl. No. 12/727,836, mailed Apr. 16, 2012, 14 pages.

Final Office Action in U.S. Appl. No. 12/700,980, mailed May 10, 2012, 24 pages.

* cited by examiner

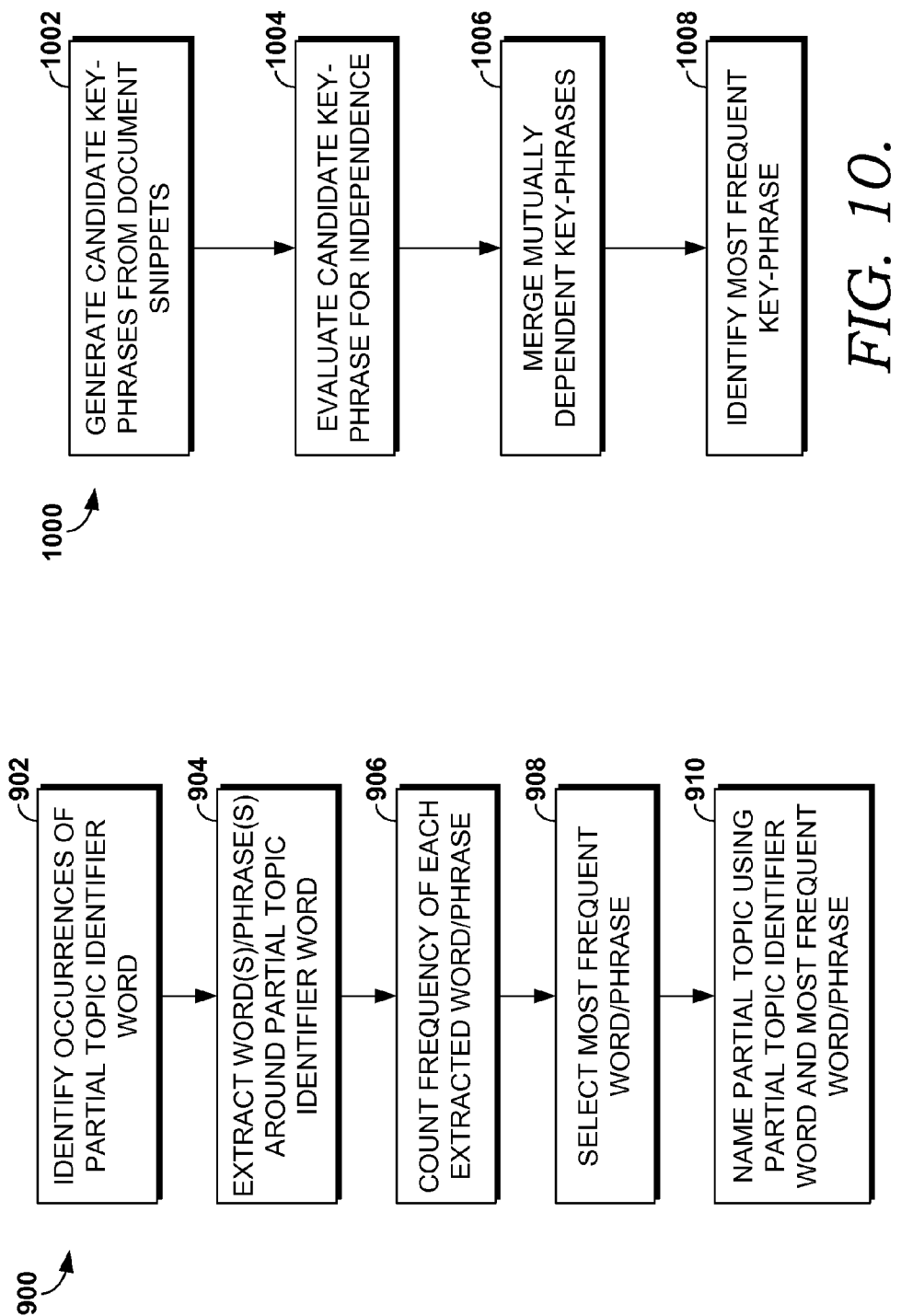

SEMANTIC ADVERTISING SELECTION FROM LATERAL CONCEPTS AND TOPICS

CROSS-REFERENCE TO RELATED APPLICATIONS

This application is related by subject matter to the invention disclosed in the following U.S. patent applications filed on even date herewith: U.S. application Ser. No. 12/701,338, entitled "Semantic Table of Contents for Search Results;" and U.S. application Ser. No. 12/700,980, entitled "Generating and Presenting Lateral Concepts;" each of which is assigned or under obligation of assignment to the same entity as this application, and incorporated in this application by reference.

BACKGROUND

Online advertising has become a significant aspect of the web browsing experience. A number of advertising delivery systems currently operate to select and deliver contextual advertisements for placement on, for instance, web pages and search result pages. In the context of web pages, advertising delivery systems operate to analyze the text of the web pages to identify keywords that are used for selecting advertisements for placement on the web pages. In the context of search, when a user submits a search query to a search engine, keywords are identified based on the terms of the search query and/or based on content of the search results. The keywords are used for selecting advertisements that are presented in conjunction with general search results for the user's query.

Typically, advertising delivery system providers receive payment from advertisers based upon pay-per-performance models (e.g., cost-per-click or cost-per-action models). In such models, the advertisements returned with search results for a given search query include links to landing pages that contain the advertisers' content. A search engine provider receives payment from an advertiser when a user clicks on the advertiser's advertisement to access the landing page and/or otherwise performs some action after accessing the landing page (e.g., purchases the advertiser's product).

In the pay-per-performance model, advertising delivery systems select advertisements for web pages and search queries based on monetization. In other words, advertisements are selected to maximize advertising revenue. This is often performed through an auction process. Advertisers bid for particular words and/or phrases as a way for selecting advertisements and determining the order in which advertisements will be displayed for a given web page or search query. Bids are typically made as cost-per-click commitments. That is, the advertiser bids a dollar amount it is willing to pay each time a user selects or clicks on a displayed advertisement selected and presented as part of a web page or a result of a given search query.

In some instances, analysis of some web pages and search queries may only identify keywords that have not been bid on by advertisers or may result in only minimal keywords that have been bid on by advertisers. As a result, only minimal or no advertisements are selected for presentation on these web pages or in conjunction with search results for these search queries.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to using lateral concepts and topics identified for search queries and web pages as phrases for selecting advertisements for presentation on search result pages and web pages. In the context of search, when a search query is received, lateral concepts and topics are identified for the search query. The lateral concepts and topics are used as phrases for advertisement selection. Selected advertisements are provided on a search results page with search results in response to the search query. In the context of a web page, when an indication of a web page is received, lateral concepts and topics are identified for the web page. The lateral concepts and topics are used as phrases for advertisement selection. Selected advertisements are provided on the web page.

BRIEF DESCRIPTION OF THE DRAWINGS

The present invention is described in detail below with reference to the attached drawing figures, wherein:

FIG. 9 is a flow diagram showing a method for naming a partial topic in accordance with an embodiment of the present invention;

FIG. 10 is a flow diagram showing a method for computing independent key-phrases in accordance with an embodiment of the present invention;

DETAILED DESCRIPTION

Figure 1:
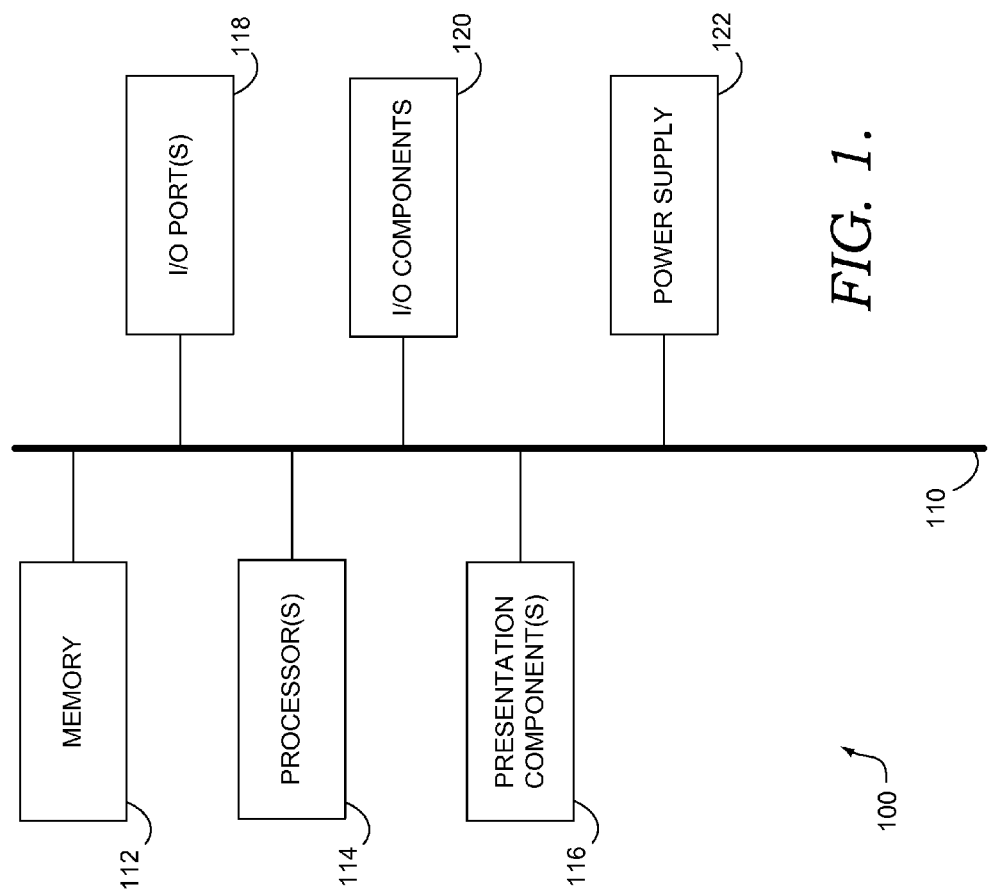
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to identifying phrases for advertisement selection based on lateral concepts and topics identified for search queries and web pages. In the context of search, when a search query is received, lateral concepts and topics are identified for the search query and used as phrases for selecting advertisements for placement on a search results page in response to the search query. In the context of a web page, when an identification of a web page is received, lateral concepts and topics are identified for the web page and used as phrases for selecting advertisements for placement on the web page.

As used herein, the term "lateral concept" refers to words or phrases that represent orthogonal topics of a search query or web page. The lateral concepts provide concepts that are orthogonal to a received search query (and/or content corresponding to the search query) or to an identified web page on which advertisements are to be placed. In some embodiments, the lateral concepts may be stored in an index with a pointer to one or more search queries and/or web pages. Accordingly, the stored lateral concepts may be identified in response to subsequent search queries—similar to previous queries—received at a search engine or in response to web page requests.

In some embodiments in which lateral concepts are determined for a search query, a search results page provided in response to a search query also includes an indication of identified lateral concepts. The lateral concepts allow a user to navigate a large collection of content having structured data, semi-structured data, and unstructured data. A computer system generates the lateral concepts by processing the collection of content matching the search query provided by the user and selecting categories for the content. The lateral concepts comprise a subset of the selected categories. The lateral concepts are presented to the user along with search results matching the search query. The lateral concepts allow the search engine to provide concepts that are orthogonal to a search query or content corresponding to the search query. In turn, the user may select one of the lateral concepts to search the combination of structured, unstructured, and semi-structured data for content corresponding to the selected lateral concept.

For instance, a search engine may receive a search query for Seattle Space Needle from a user. The search engine processes the query to identify lateral concepts and search results. The lateral concepts may be selected from the structure of metadata stored with content for Seattle Space Needle and/or the lateral concepts may be selected from feature vectors generated by parsing search results associated with the search query.

The storage structure may include metadata, e.g., content attributes for the Seattle Space Needle. The Seattle Space Needle content attributes may include a tower attribute, a Seattle attraction attribute, and an architecture attribute. The tower attribute may include data that specifies the name and height of the Seattle Space Needle and other towers, such as Taipei 101, Empire State Building, Burj, and Shanghai World Financial Center. The Seattle attraction attribute may include data for the name and location of other attractions in Seattle, such as Seattle Space Needle, Pike Place Market, Seattle Art Museum, and Capitol Hill. The architecture attribute may include data for the architecture type, modern, ancient, etc., for each tower included in the tower attribute. Any of the Seattle Space Needle content attributes may be returned as a lateral concept by the search engine.

Alternatively, the search results may be processed by a computer system to generate lateral concepts that are returned with the search results. The content associated with the search results is parsed to identify feature vectors. The feature vectors include a category element that is associated with the content. The feature vectors are used to compare the search results and calculate a similarity score between the search results or between the search results and the query. The categories in the feature vectors are selected by the computer system based on the similarity score and returned as lateral concepts in response to the search query.

As noted above, topics may also be identified for search queries and web pages and used as phrases for advertisement selection. Topics may be identified in a number of different manners within various embodiments of the present invention. In some embodiments, when a search query or identification of a web page is received, it is determined whether an ontology mapping already exists for the search query or web page. For instance, a number of topics may have been manually or algorithmically generated and cached for a search query matching the received search query or for the identified web page. In such embodiments, topics from the existing ontology mapping are retrieved. In further embodiments, the search query or identified web page is analyzed in conjunction with an ontology of topics and/or an ontology of partial topics to identify relevant topics. In still further embodiments, the search query or identified web page is analyzed to identify independent key-phrases, and key-phrase topics are selected. When a large number of topics are identified, the topics are ranked, and the highest ranking topics are selected.

Selected topics may be used as phrases for advertisement selection. In some embodiments, selected topics may also be used to generate a table of contents for search results in response to a search query. When a search query is received, search results are retrieved. Additionally, topics relevant to the search query and search results are identified, and a table of contents is generated from identified topics. A search results page is returned in response to the search query that includes search results and the generated table of contents. A user may select topics from the table of contents to view different search results relevant to each topic. In some embodiments, the table of contents is static as the user selects different topics from the table of contents to view different sets of search results, thereby allowing the user to navigate search results within the context of the initial search query.

Accordingly, in one aspect, an embodiment of the present invention is directed to one or more computer-readable media storing computer-usable instructions that, when used by one or more computing devices, cause the one or more computing devices to perform a method. The method includes receiving a search query or an indication of a web page. The method also includes identifying one or more lateral concepts based on the search query or content of the web page, wherein each lateral concept is identified as a candidate phrase for advertisement selection purposes. The method further includes identifying one or more topics based on the search query or the content of the web page, wherein each topic is identified as a candidate phrase for advertisement selection purposes. The method also includes selecting one or more phrases from the identified candidate phrases. The method further includes querying an advertisement inventory using the one or more selected phrases to select one or more advertisements. The method still further includes providing the one or more advertisements for presentation to a user.

In another embodiment, an aspect of the invention is directed to a computer system including one or more processors and one or more computer-readable media configured to select and deliver advertisements. The computer system includes a phrase generator to generate candidate phrases based on a search query or identified web page. The phrase generator includes a lateral concept generator and a semantic topic engine. The lateral concept generator is configured to select lateral concepts from categories associated with content in storage based on similarity scores for the stored content. The semantic topic engine is configured to identify topics by analyzing the search query or web page with an ontology of topics and with an ontology of partial topics and by generating key-phrase topics. The lateral concepts and topics are identified as candidate phrases. The computer system also includes a phrase selection component configured to select one or more phrases from the candidate phrases. The computer system further includes an advertising delivery system including an advertisement selection component and an advertisement delivery engine. The advertisement selection component is configured to query an advertisement inventory using the one or more phrases to select one or more advertisements. The advertisement delivery engine is configured to deliver the one or more advertisements for presentation to a user.

A further embodiment of the present invention is directed to one or more computer-readable media storing computer-usable instructions that, when used by one or more computing devices, cause the one or more computing devices to perform a method. The method includes receiving a search query and performing a search using the search query to identify content from storage that corresponds with the search query. The method also includes identifying a plurality of categories associated with the obtained content and selecting a subset of the plurality of identified categories as lateral concepts, wherein the lateral concepts are identified as candidate phrases for advertisement selection. The method further includes receiving a plurality of documents snippets from the search. The method also includes identifying a first set of one or more candidate topics by comparing one or more document snippets to an ontology of topics, identifying a second set of one or more candidate topics by comparing one or more document snippets to an ontology of partial topics, and identifying a third set of one or more candidate topics by generating key-phrase topics from one or more document snippets. The method further includes selecting topics from the first, second, and third set of candidate topics as candidate phrases for advertisement selection. The method still further includes selecting one or more phrases from the identified candidate phrases, querying an advertisement inventory using the one or more selected phrases to select one or more advertisements, and providing the one or more advertisements for presentation to a user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
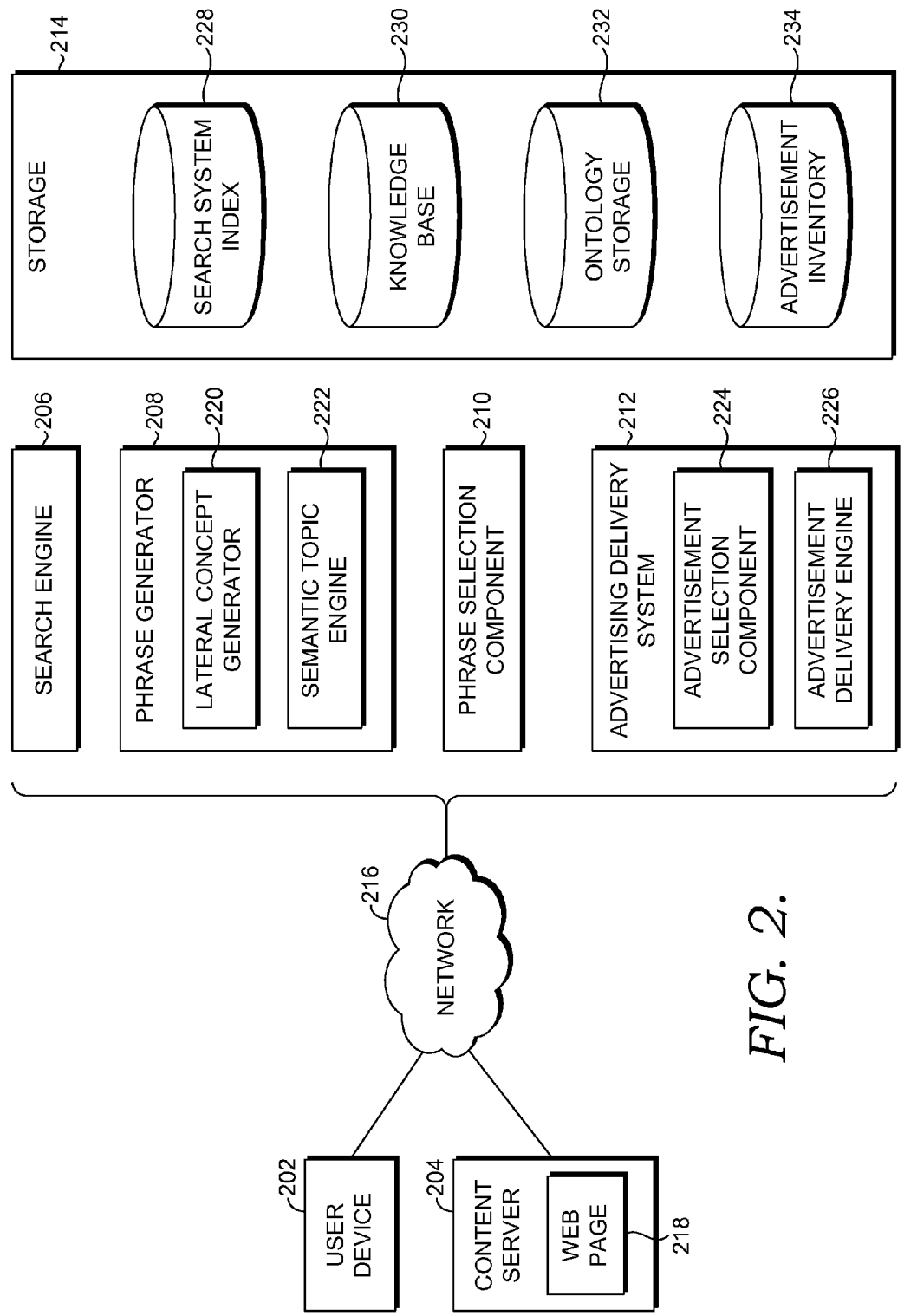
FIG. 2 is a block diagram of an exemplary system for delivering advertisements in accordance with an embodiment of the present invention.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a user device 202, a content server 204, a search engine 206, a phrase generator 208, a phrase selection component 210, an advertising delivery system 212, and storage 214. Each of the components shown in FIG. 2 may be embodied on any type of computing device, such as computing device 100 described with reference to FIG. 1, for example. The components may communicate with each other via a network 216, which may include, without limitation, one or more local area networks (LANs) and/or wide area networks (WANs). Such networking environments are commonplace in offices, enterprise-wide computer networks, intranets, and the Internet. It should be understood that any number of user devices, content servers, search engines, phrase generators, phrase selection components, advertiser delivery systems and storage may be employed within the system 200 within the scope of the present invention. Each may comprise a single device or multiple devices cooperating in a distributed environment. For instance, the system 200 may comprise multiple devices arranged in a distributed environment that collectively provide the functionality of the system 200 described herein. Additionally, other components not shown may also be included within the system 200.

In accordance with embodiments of the present invention, a user may employ the user device 202 to submit search queries to the search engine 206 and, in response, receive a search results page with search results and advertisements. For instance, the user may employ a web browser on the user device 202 to access a search input web page and enter a search query. As another example, the user may enter a search query via a search input box provided by a search engine toolbar located, for instance, within a web browser, the desktop of the user device 202, or other location. One skilled in the art will recognize that a variety of other approaches may also be employed for providing a search query within the scope of embodiments of the present invention.

When the search engine 206 receives a search query from a user device, such as the user device 202, the search engine 206 performs a search on a search system index 228, knowledge base 230, and/or other data storage containing searchable content maintained in storage 214. The search system index 228 may generally contain unstructured and/or semi-structured data, while the knowledge base 230 may generally contain structured data. Accordingly, the search engine 206 identifies a number of search results in response to the received search query. Additionally, advertisements are selected for inclusion in the search results page as will be described in further detail below. In response to the search query, a search results page may be provided to the user device 202 that includes search results with selected advertisements.

The user may also employ the user device 202 to view web pages hosted by content servers, such as web page 218 hosted on the content server 204. For instance, the user may employ a web browser on the user device 202 to request the web page 218 from content server 204. In embodiments of the present invention, advertisements are selected (as will be described in further detail below) for inclusion on the web page 218 when presented to the user on the user device 202.

The phrase generator 208, phrase selection component 210, and advertising delivery system 212 generally operate to select and deliver advertisements on search result pages and web pages. The phrase generator 208 includes a lateral concept generator 220 and semantic topic engine 222 that analyze a search query (and/or associated search results) or a web page (and/or related content) to identify phrases that may be used for advertisement selection. The lateral concept generator 220 identifies lateral concepts for a search query or web page, and the semantic topic engine 222 identifies topics for a search query or web page. In some embodiments in the context of search, lateral concepts may be included on a search results page to allow a user to employ the lateral concepts to drill across a combination of structured, unstructured, and semi-structured content. In some embodiments in the context of search, a table of contents may be generated based on identified topics, and the table of contents may be included on a search results page. The table of contents lists identified topics and allows the user to select topics and view search results associated with each topic.

Lateral concepts and topics identified by the lateral concept generator 220 and semantic topic engine 222 are treated as candidate phrases for advertisement selection. The phrase selection component 210 operates to analyze the candidate phrases and select phrases that will be used to advertisement selection. In embodiments, the phrase selection component 210 ranks the candidate phrases, and the rankings are used for selecting phrases for further processing. In some embodiments of the present invention, candidate phrases are ranked based on monetization. In other words, the candidate phrases are analyzed to estimate the extent to which use of each candidate phrase to select advertisements will generate advertising revenue. Candidate phrases that are determined to be more likely to generate higher advertising revenue are ranked higher. In various embodiments, one or more candidate phrases are selected based on ranking. In some embodiments, the highest N ranking candidate phrases (e.g., highest five ranking candidate phrases) are selected. In other embodiments, candidate phrases having a ranking greater than a threshold are selected. In further embodiments, candidate phrases having a significantly higher ranking than other candidate phrases are selected. Any and all such variations of the above, as well as other considerations, may be used to selected phrases from a group of candidate phrases.

The advertising delivery system 212 receives phrases from the phrase selection component 210, selects advertisements, and delivers the selected advertisements for presentation on a search results page in response to a search query or for presentation on a web page in response to an indication of the web page. The advertisement delivery system 212 includes an advertisement selection component 224 that queries the advertisement inventory 234 using selected phrases to select advertisements that will be delivered for presentation to a user. The advertisement inventory 234 may store advertisements and metadata associated with each advertisement. The metadata stored for an advertisement may include information used in advertisement selection, such as for instance, bid values from advertisers, click-through rates, etc. In embodiments of the present invention, the advertisement selection component 224 selects advertisements based on relevance of the advertisements to selected phrases and/or based on monetization (i.e., an estimate of the extent to which the advertisements will generate advertising revenue). Auction processes currently employed by advertising systems may be used for selecting advertisements. Such processes are well known to those skilled in the art and therefore will not be discussed in further detail herein.

The advertising delivery system also includes an advertisement delivery engine 226 that facilitates delivery of selected advertisement for presentation to a user. In the context of search, a search results page is generated that includes search results in response to the user's search query and the selected advertisements. In the context of a web page, the advertisements are delivered for inclusion in an area of the web page provided for presentation of advertisements.

Figure 3:
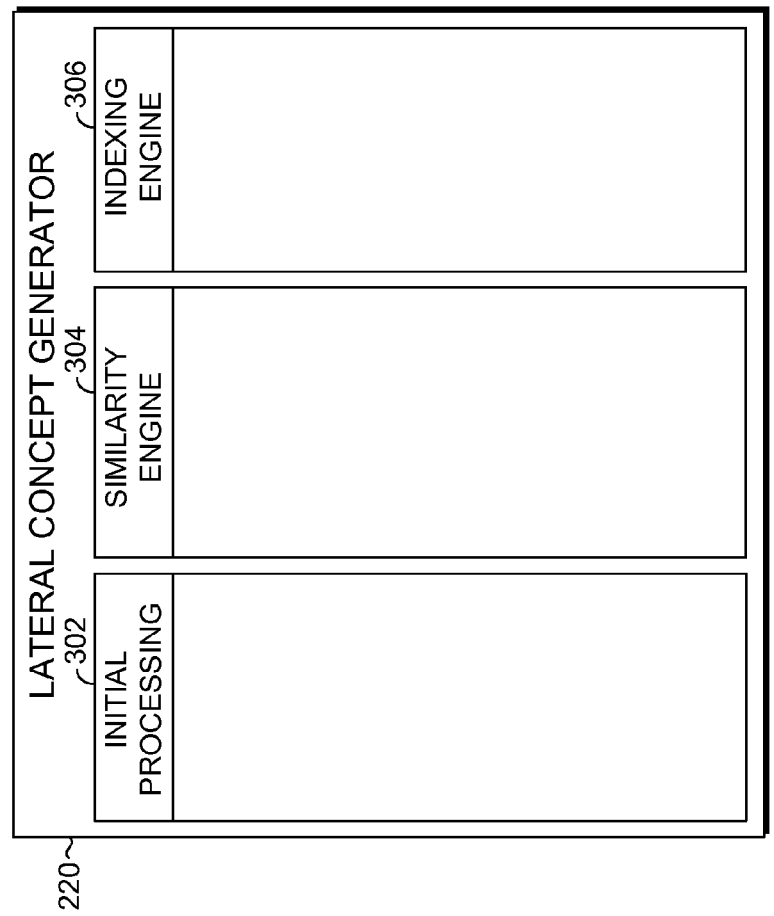
FIG. 3 is a block diagram of an exemplary lateral concept generator in accordance with an embodiment of the present invention.

As indicated above, the lateral concept generator 220 generates lateral concepts in response to a search query and/or for a web page. In one embodiment, such as that shown in FIG. 3, the lateral concept generator 220 includes an initial processing component 302, a similarity engine 304, and an indexing engine 306. The lateral concept generator 220 receives categories and content from storage 214. In turn, the content and categories are processed by one or more components 302, 304, and 306 of the lateral concept generator 220.

The initial processing component 302 is configured to locate content that matches a search query or web page, to analyze the content, and to extract information using one or more data processing methods. In this regard, the initial processing component 302 may be used to analyze content and extract information from the three types of data: unstructured data, structured data, and semi-structured data maintained by storage 214. Unstructured data may comprise documents with a series of text lines. Documents that are included in the category of unstructured data may have little or no metadata. Structured data, on the other hand, may comprise a traditional database where information is structured and referenced. Semi-structured data may comprise a document such as a research paper or a Security and Exchange Commission filing, where part of the document comprises lines of text and part of the document comprises tables and graphs used for illustration. In the case of semi-structured data, the structured components of a document may be analyzed as structured data and the unstructured components of the documents may be analyzed as unstructured data.

Feature vectors are used to compare content matching the search query or web page. The feature vectors may include the following elements: a group of words, a concept, and score. The group of words represents a summary or sampling of the content. The concept categorizes the content, and the score contains a similarity measure for the content and additional content matching the search query or web page. For instance, a feature vector for Space Needle content may include a group of words "monument built for world fair" a concept "tower" and a score "null." The concepts element of the feature vectors may be selected as the lateral concept based on the score assigned to the feature vector.

The values for the elements of the feature vector may be generated manually or automatically. A subject matter expert may manually populate the elements of the feature vector. Alternatively, the elements of the feature vector may be populated automatically by the lateral concept generator 220.

The initial processing component 302 may include a lexical analysis, a linguistic analysis, an entity extraction analysis, and attribute extraction analysis. In an embodiment, the initial processing component 302 creates feature vectors for the content in storage 214. The initial processing component 302 automatically populates the words and concepts for feature vectors. In certain embodiments, the initial processing component 242 selects the concepts from one or more ontologies in the ontology storage 232 of storage 214, or from the words extracted from the content.

The similarity engine 304 calculates a similarity score that populates the score element for the feature vector. The similarity engine 304 is a component of the lateral concept generator 220. The similarity engine 304 calculates a similarity score that is stored in the feature vector for the content retrieved from storage 214. The similarity score may represent similarity to other content in storage 214 matching a received search query or identified web page, similarity to the search query, or similarity to a web page, such as web page 218. In turn, the similarity score is used to select several categories from concepts identified in the feature vectors associated with the content matching the search query or web page. The selected categories are identified as lateral concepts.

In one embodiment, the similarity engine 304 may calculate similarity between content matching a search query or web page using the feature vectors. The similarity score may be calculated based on distance between the feature vectors using the Pythagorean theorem for multidimensional vectors. For instance, when the storage 214 includes content matching a received search query or the web page 218, the lateral concept generator 220 may return several categories based on scores assigned to content within each of the several categories. The lateral concept generator 220 obtains the matching content and corresponding categories from storage 214. In turn, the lateral concept generator 220 generates the feature vector for the matching content. Also, the lateral concept generator 220 generates a content collection using the categories associated with the matching content. Each content in the content collection is processed by the lateral concept generator 220 to create feature vectors. In turn, each feature vector for the content collection is compared to the feature vector for the matching content to generate a similarity score. In turn, the feature vectors for the content collection are updated with similarity scores calculated by the similarity engine 302. The similarity engine 302 may select a number of feature vectors with high similarity scores in each category, average the scores, and assign the category the averaged score. In an embodiment, the similarity engine 302 selects three feature vectors within each category assigned the highest score to calculate the average score that is assigned to the categories. Thus, as an example, the top five categories with the highest scores may be identified as lateral concepts.

In another embodiment, the similarity engine 304 may calculate similarity between content and a received search query or a web page, such as web page 218. The similarity score may be calculated based on distance between the feature vectors using the Pythagorean theorem for multidimensional vectors. For instance, when the storage 214 does not include content matching the search query or the web page 218, the lateral concept generator 220 may return several categories based on scores assigned to content within each of the several categories. The lateral concept generator 220 obtains a predetermined number of content related to the search query or web page 218 and corresponding categories from the storage 214. In one embodiment, the lateral concept generator 220 obtains a predetermined number (e.g., fifty) of content items from storage 214 having a high similarity score for the search query of web page 218. In turn, the lateral concept generator 220 generates a feature vector for the search query or web page 218. Also, the lateral concept generator 220 retrieves a collection of content using the categories associated with the obtained content. Content in the collection of content is processed by the lateral concept generator 220 to create feature vectors. In turn, the feature vectors for content in the collection of content are compared to the feature vector for the search query or web page 218 to generate a similarity score. In turn, the feature vectors for the content collection are updated with similarity scores calculated by the similarity engine 304. The similarity engine 304 may select a number of feature vectors with high similarity scores in each category, average the scores, and assign the category the averaged score. In an embodiment, the similarity engine 304 selects three feature vectors within each category assigned the highest score to calculate the average score that is assigned to the categories. In turn, the top five categories with the highest scores are identified as lateral concepts.

The similarity engine 304 may use word frequency to calculate a query similarity score for the content in storage 214. In one embodiment, the similarity engine 304 calculates a query similarity score ($S_q$) when a match to a search query is not stored in the storage 214: $S_q = \sqrt{freq(w)} \times \log(docfreq(w))$, where freq(w) is the frequency of the query (w) in the storage and docfreq is the frequency of the query within the content that is selected for comparison. The content assigned the largest $S_q$ are collected by the similarity engine 244, and the top fifty documents are used to generate the lateral concepts.

The indexing engine 306 is an optional component of the lateral concept generator 220. The indexing engine 306 receives the lateral concepts from the similarity engine 304 and stores the lateral concepts in storage 214 along with the search query or web page that generates the lateral concepts. In turn, a subsequent search query or web page request similar to a previously processed search query or web page may bypass the lateral concept generator 220 and obtain the lateral concepts stored in the storage 214.

In embodiments, the storage 214 provides content and previously generated lateral concepts. The storage 214 stores content, ontologies, and advertisements. In certain embodiments, the storage 214 includes one or more data stores, such as relational and/or flat file databases and the like, that store a subject, object, and predicate for each content. The storage 214 may reference content along with previously generated lateral concepts. The content may include structured, semi-structured, and unstructured data. In some embodiments, the content may include video, audio, documents, tables, and images having attributes that are stored in the flat file databases. The computer system 200 may algorithmically generate the lateral concepts, or content attributes may be used as lateral concepts.

For instance, content attributes for the Seattle Space Needle or a particular stock may be stored in storage 214. The content attributes may be provided as lateral concepts in response to a search query for the Seattle Space Needle or the particular stock, respectively. The Seattle Space Needle content attributes may include a tower attribute, a Seattle attraction attribute, and an architecture attribute. The tower attribute may include data that specifies the name and height of the Seattle Space Needle and other towers, such as Taipei 101, Empire State Building, Burj, and Shanghai World Financial Center. The Seattle attraction attribute may include data for the name and location of other attractions in Seattle, such as Seattle Space Needle, Pike Place Market, Seattle Art Museum, and Capitol Hill. The architecture attribute may include data for the architecture type, modern, ancient, etc., for each tower included in the tower attribute. Any of the Seattle Space Needle content attributes may be returned as a lateral concept.

A particular stock may include stock content attributes. For instance, MSFT content attributes may include a type attribute, an industry attribute, and a profit to earnings (PE) attribute. The type attribute includes data for business type, e.g., corporation, company, incorporated, etc. The industry attribute, may specify the industry, e.g., food, entertainment, software, etc., and the PE attribute includes the value of the PE. Any of the stock content attributes may be returned as a lateral concept.

The lateral concepts that are generated algorithmically by the lateral concept generator 220 may be stored in the storage 214. In turn, subsequent search queries received by the search engine 220 or web page requests may be responded to, in certain embodiments, with the lateral concepts stored in the storage 214. For a given search query or web page, the storage 214 may store several lateral concepts. Accordingly, the storage 214 may be accessed to obtain a list of lateral concepts for a received search query or requested web page. In some embodiments, the lateral concepts may be provided as part of a search results page to enable a user to navigate content in the storage 214.

The ontologies in the ontology storage 232 include words or phrases that correspond to content in storage 214. The categories associated with content in storage 214 may be selected from multiple ontologies. Each ontology includes a taxonomy for a domain and the relationship between words or phrases in the domain. The taxonomy specifies the relationship between the words or phrases in a domain. The domains may include medicine, art, computers, etc. In turn, the categories associated with the content may be assigned a score by the lateral concept generator 220 based on similarity. In one embodiment, the lateral concept generator 220 calculates the score based on similarity to content obtained in response to a received search query or a requested web page. In another embodiment, the lateral concept generator 220 calculates the score based on similarity to the search query or web page. The lateral concept generator 220 selects several categories as lateral concepts based on the score.

The phrase generator 208 also includes a semantic topic engine 222 that selects topics for received search queries or web pages, such as web page 218. Topics identified by the semantic topic engine 222 may be used to select advertisements for inclusion on a search results page in response to a search query or for inclusion on a requested web page, such as web page 218. In some embodiments, topics identified by the semantic topic engine 222 for a search query are used to generate a table of contents for inclusion on a search results page that facilitates navigation of the search results by a user. In such embodiments, in response to a search query, a search results page may be provided to the user device 202 that includes search results with a table of contents that includes topics identified by the semantic topic engine 222.

Figure 4:
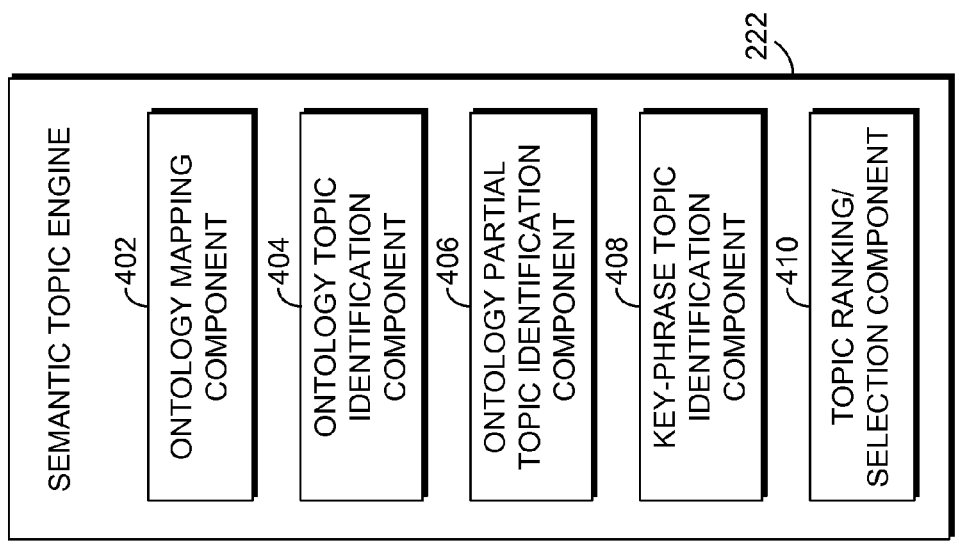
FIG. 4 is a block diagram of an exemplary semantic topic engine in accordance with an embodiment of the present invention.

As noted above, the semantic topic engine 222 identifies topics relevant to received search queries or identified web pages. As shown in FIG. 4, the semantic topic engine 222 generally includes an ontology mapping component 402, an ontology topic identification component 404, an ontology partial topic identification component 406, a key-phrase topic identification component 408, and a topic ranking/selection component 410. The semantic topic engine 222 identifies semantic topics employing any of components 402, 404, 406, and 408. In some embodiments of the present invention, each of the components 402, 404, 406, and 408 may be employed to identify topics for a given search query or web page, and the identified topics may be ranked and certain topics selected by the ranking/selection component 410. In other embodiments, topics may be identified by only a portion of the components 402, 404, 406, and 408. For instance, in one embodiment, once a threshold number of topics are identified by one or more of components 402, 404, 406, and 408, further analysis by remaining components is not performed. In further embodiments, the semantic topic engine 222 may include only a portion of the components 402, 404, 406, and 408 shown in FIG. 4. Any and all such variations are contemplated to be within the scope of embodiments of the present invention.

When a search query is received or a web page is identified, the ontology mapping component 402 operates to identify whether an ontology mapping already exists for the search query or web page. For instance, the search query may be a top-end search query for which search system personnel have manually identified relevant topics for a topics of contents for the search query. As another example, the received search query or web page may correspond with a search query or web page for which relevant topics have already been identified and cached for the search query or web page. If the ontology mapping component 402 determines that an ontology mapping already exists for a received search query or web page, topics are retrieved based on the ontology mapping. In some embodiments, only topics retrieved by the ontology mapping component 402 or employed. In other embodiments, additional topics are identified by one or more of the other components 404, 406, and/or 408, as described in further detail below.

The ontology topic identification component 404 operates on a received search query or web page in conjunction with an ontology of topics stored in the ontology storage 232 to identify relevant topics for the search query or web page. The ontology storage 232 may store one or more ontologies, which are used by the ontology topic identification component 404 to identify semantic concepts as topics for received search queries or identified web pages. Each ontology includes a collection of words and phrases defining concepts and relationships between the concepts. In some embodiments, a search is performed on the search system index 228, knowledge base 230, and/or other content in the storage 214 to retrieve search results for a received search query, and the ontology topic identification component 404 analyzes the search results in conjunction with the ontology of topics to identify relevant topics for the search query. In further embodiments, content in the storage 214 may be analyzed to identify content relevant to a web page that may be used by the ontology topic identification component 404 in conjunction with the ontology of topics to identify relevant topics for the web page.

The ontology partial topic identification component 406 functions in a manner similar to the ontology topic identification component 404 but uses an ontology of partial topics instead of an ontology to topics. As used herein, a partial topic refers to partially-named topics. Each partial topic includes a partial topic identifier word that may be combined with an additional word or phrase to create a topic. For example, "reviews" may be a partial topic. When analyzed in context, the partial topic identifier word "reviews" may be combined with additional words, such as, "expert" or "user" to generate the topics "expert reviews" or "user reviews." Accordingly, once partial topics are identified for a search query or web page, the ontology partial topic identification component 406 or an associated component names the partial topic.

The key-phrase topic identification component 408 analyzes search results for a received search query or content of a web page (and possibly related content) to generate candidate key-phrases. Generally, the key-phrase topic identification component 408 generates key-phrases from search results or content of a web page and identifies independent key-phrases. The independent key-phrases are evaluated to identify candidate topics.

A number of topics may be identified for a received search query or identified web page by the ontology mapping component 402, ontology topic identification component 404, ontology partial topic identification component 406, and/or key-phrase topic identification component 408. In some instances, all identified topics may be considered as candidate phrases by the phrase selection component 210. In other instances, a large number of topics may be identified, and only a subset of the identified topics is considered as candidate phrases by the phrase selection component 210. In some embodiments, the semantic topic engine 222 includes a topic ranking/selection component 410 that operates to rank and select topics as candidate phrases for further processing. Topics may be ranked using a number of different factors in accordance with various embodiments of the present invention. By way of example only and not limitation, each topic may be ranked based on the total number of documents assigned to each topic. A larger number of documents assigned to a given topic may provide a higher ranking for the topic. A topic may also be ranked based on the ranking of each search result (or a selection of search results—e.g., the top N search results) assigned to the topic. The ranking of each search result corresponds with each search result's relevance to the search query. Accordingly, more highly relevant search results being assigned to a given topic may provide a higher ranking for the topic. The length (e.g., number of words) of each topic may further be used to rank the topics. Any and all such variations are contemplated to be within the scope of embodiments of the present invention. After ranking the candidate topics, the topic ranking/selection component 410 selects phrases for further processing.

Figures 5, 6:
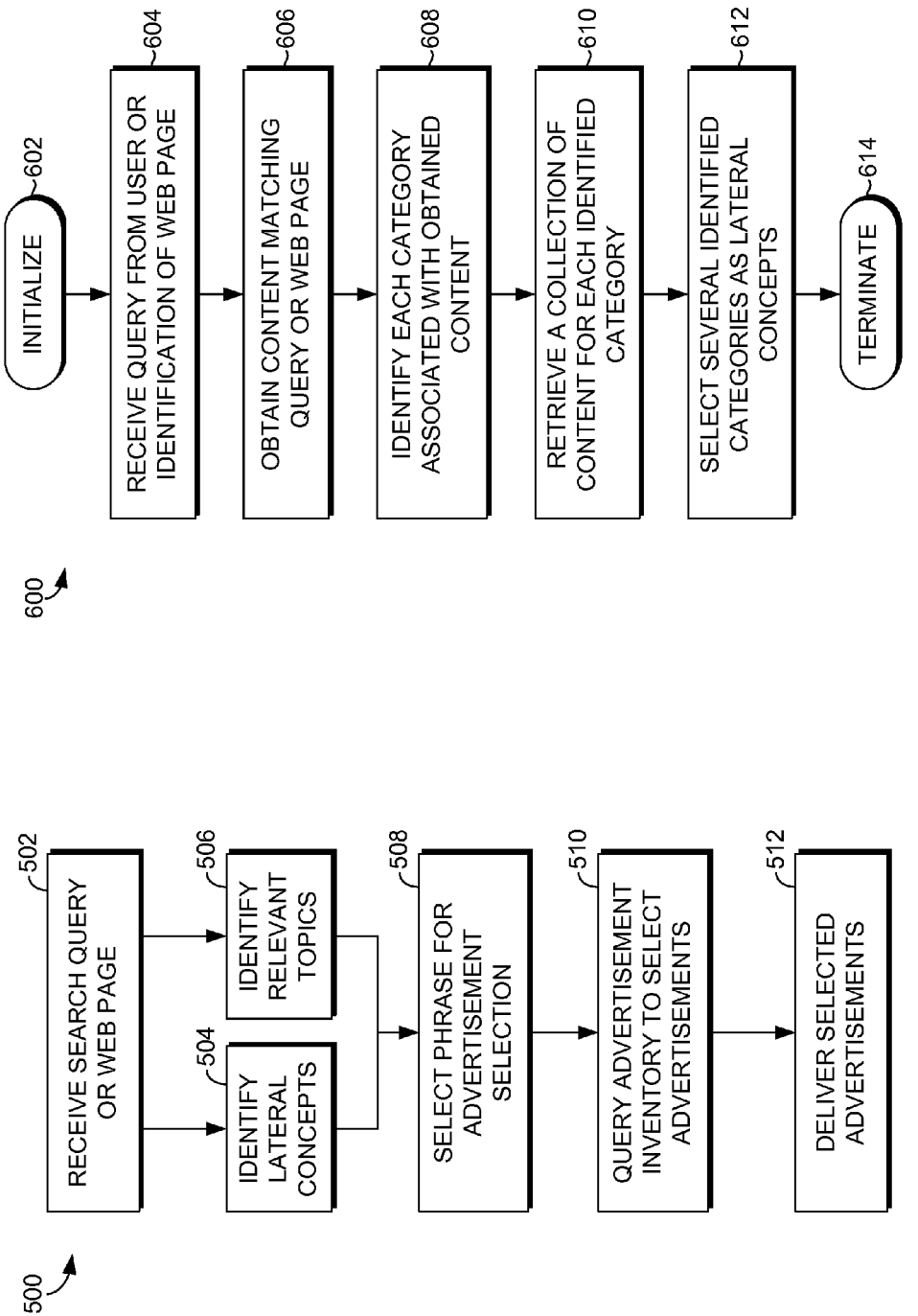
FIG. 5 is a flow diagram showing an overall method for selecting advertisements in accordance with an embodiment of the present invention.
FIG. 6 is a flow diagram showing a method for generating lateral concepts for use in selecting advertisements in accordance with an embodiment of the present invention.

Turning now to FIG. 5, a flow diagram is provided that illustrates an overall method 500 for selecting advertisements for placement on a search results page or web page in accordance with an embodiment of the present invention. Initially, as shown at block 502, a search query is received or a web page is identified for which advertisements are to be selected and delivered for presentation. Lateral concepts are identified for the search query or web page by a lateral concept generator, such as the lateral concept generator 220 of FIG. 2, as shown at block 504. Lateral concepts may be identified, for instance, as described in further detail below with reference to the method 600 of FIG. 6 and/or the method 700 of FIG. 7. Relevant topics are also identified for the search query or web page by a semantic topic engine, such as the semantic topic engine 222 of FIG. 2, as shown at block 506. Topics may be identified, for instance, as described in further detail below with reference to the methods 800, 900, 1000, and 1100 of FIGS. 8, 9, 10, and 11, respectively.

The lateral concepts and topics identified at blocks 504 and 506 are considered as candidate phrases for advertisement selection at block 508. In particular, the candidate phrases from the lateral concepts and topics are ranked and the rankings are used for selecting phrases for further processing. In some embodiments of the present invention, candidate phrases are ranked based on monetization. In other words, the candidate phrases are analyzed to estimate the extent to which use of each candidate phrase to select advertisements will generate advertising revenue. Candidate phrases that are determined to be more likely to generate higher advertising revenue are ranked higher. In various embodiments, one or more candidate phrases are selected based on ranking. In some embodiments, the highest N ranking candidate phrases (e.g., highest five ranking candidate phrases) are selected at block 508. In other embodiments, candidate phrases having relevance greater than a threshold are selected at block 508. In further embodiments, candidate phrases having a significantly higher ranking than other candidate phrases are selected. Any and all such variations of the above, as well as other considerations, may be used to selected phrases from a group of candidate phrases.

An advertisement inventory is queried using the selected phrases at block 510 to select advertisements that will be delivered for presentation to a user. In embodiments of the present invention, the advertisements may be selected based on relevance of the advertisements to selected phrases and/or based on monetization (i.e., an estimate of the extent to which the advertisements will generate advertising revenue). Auction processes currently employed by advertising systems may be used for selecting advertisements. Such processes are well known to those skilled in the art and therefore will not be discussed in further detail herein.

As shown at block 512, the selected advertisements are delivered for presentation to a user. In the context of search, a search results page is generated that includes search results in response to the user's search query and the selected advertisements. In the context of a web page, the advertisements are delivered for inclusion in an area of the web page provided for presentation of advertisements.

A computer system may execute at least two computer-implemented methods for dynamically generating lateral concepts. In a first embodiment, the lateral concepts are selected based on scores between feature vectors of content matching the query and other content in storage. With reference to FIG. 6, a flow diagram is provided that illustrates a method 600 for generating lateral concepts in accordance with an embodiment of the invention. The method initializes in block 602 when the computer system is connected to a network of client devices. A search query or identification of a web page is received at block 604. In turn, the computer system obtains content that corresponds to the user query or web page from storage, as shown at block 606. At block 608, the computer system identifies categories associated with the obtained content corresponding with the received search query or identified web page. In one embodiment, the categories include phrases in one or more ontologies. In another embodiment, the categories comprise attributes of the obtained content corresponding with the received search query or identified web page. In turn, the computer system retrieves, from storage, a collection of content that corresponds to each identified category, as shown at block 610.

At block 612, the computer system selects several identified categories as lateral concepts based on scores assigned to content in the collection of content. In one embodiment, the lateral concepts may include orthogonal concepts. The lateral concepts may be stored in the storage of the computer system.

In certain embodiments, the content is represented as feature vectors, and the score is assigned to the content based on similarity between feature vectors. The lateral concepts are used in embodiments to identify phrases for selecting advertisements as discussed hereinabove. In some embodiments, the lateral concepts may also be provided to the user, for instance, in a search results page with search results in response to a search. In such embodiments, content displayed with the lateral concepts may be filtered by the computer system based on the similarity score assigned to the content.

The computer system may select, in some embodiments, orthogonal concepts by identifying the normal to a plane corresponding to the feature vector of the obtained content. In turn, feature vectors for the collection of content that create planes, which are parallel to a plane created by the normal, are processed by the computer system to obtain categories of the content associated with those feature vectors. Several of these categories may be returned as lateral concepts based on a score assigned to the content within the categories. The method terminates at block 614.

As mentioned above, the computer system may execute at least two computer-implemented methods for dynamically generating lateral concepts. In a second embodiment, the lateral concepts are selected based on scores between feature vectors for search query or web page and content in storage. The computer system may execute this method when the storage does not contain a match to the search query or web page. In some embodiments, a match is determined without using stems for the terms included in the search query or web page. Thus, the storage of the computer system may include other matches that are based on the stems of the terms included in the search query or web page. These other matches may be used to generate the lateral concepts.

Figure 7:
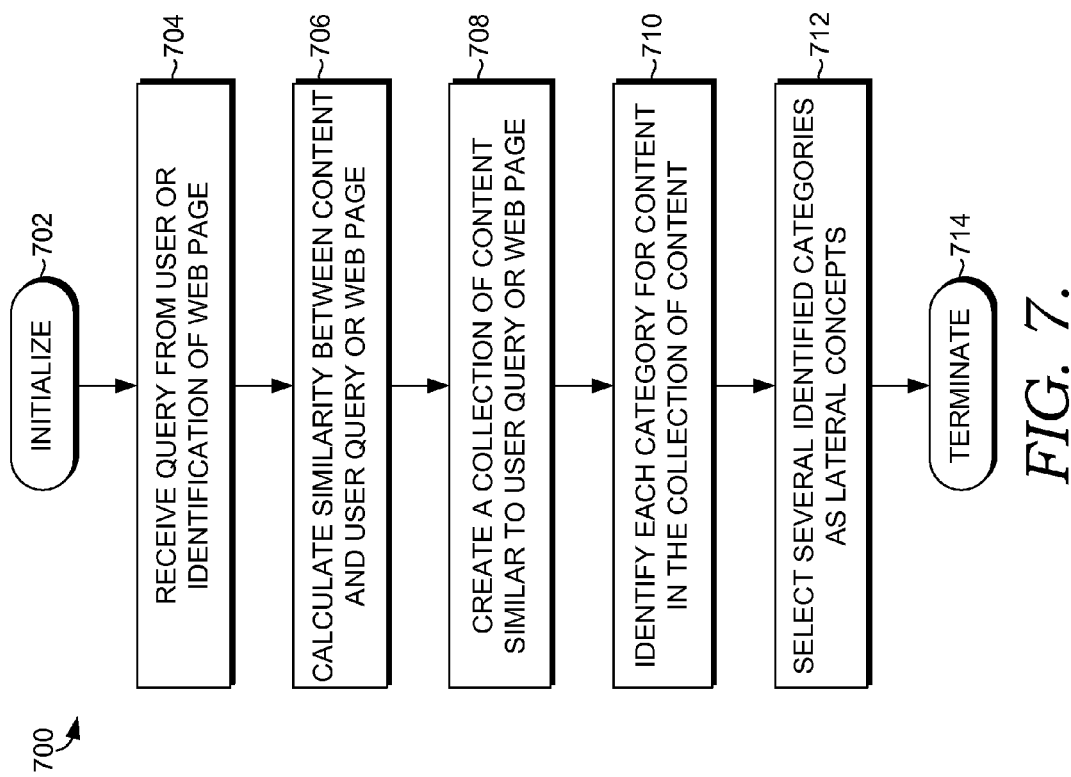
FIG. 7 is a flow diagram showing another method for generating lateral concepts for use in selecting advertisements in accordance with an embodiment of the present invention.

Referring to FIG. 7, a flow diagram is provided that illustrates an alternative computer-implemented method 700 for generating knowledge content in accordance with an embodiment of the invention. The method initializes at block 702 when the computer system is connected to a network of client devices.

A search query or identification of a web page is received at block 704. At block 706, the computer system calculates similarity between content in storage and the search query or web page. At block 708, the computer system creates a collection of content having a predetermined number of content similar to the search query or web page. In turn, the computer system identifies each category that corresponds to content in the collection of content, as shown at block 710. At block 712, the computer system selects several identified categories as lateral concepts based on scores assigned to content in the collection of content.

In certain embodiments, the search query or web page and content are represented as feature vectors, and the score is assigned to the content based on similarity between feature vectors for the search query or web page and content. In embodiments, the lateral concepts are used as phrases for advertisement selection as discussed hereinabove. In some embodiments, lateral concepts may also be to the user in a search results page in response to a search query. In such embodiments, content displayed with the lateral concepts may be filtered by the computer system based on the similarity score assigned to the content.

In one embodiment, orthogonal concepts may be included in the lateral concepts. The orthogonal concepts are selected by identifying the normal to a plane corresponding to the feature vector of the query. In turn, feature vectors for the collection of content that create planes, which are parallel to a plane created by the normal, are processed by the computer system to obtain categories of the content associated with those feature vectors. Several of these categories may be returned as lateral concepts based on a score assigned to the content within the categories. The method terminates at block 714.

Figure 8:
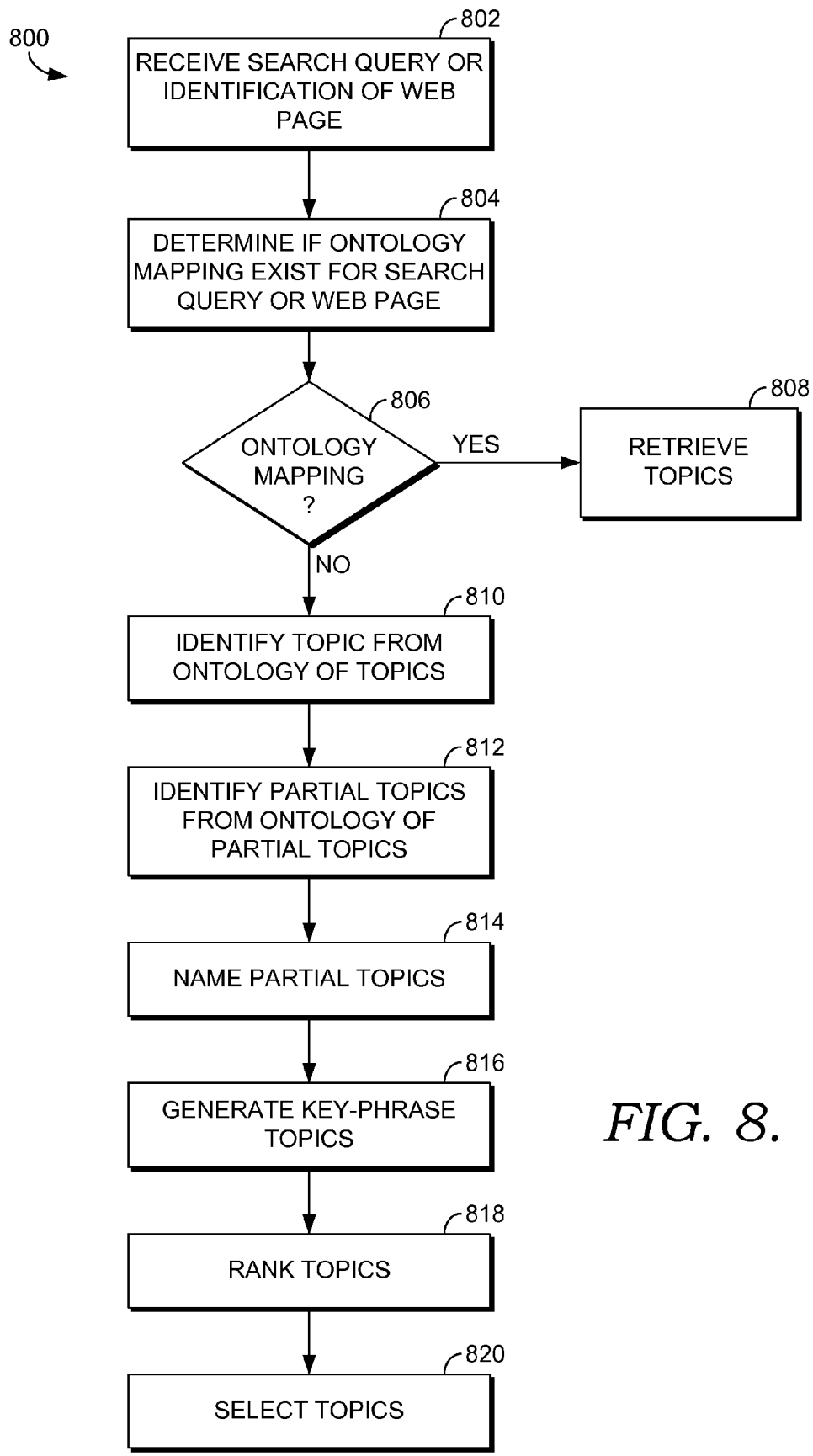
FIG. 8 is a flow diagram showing a method for identifying topics for use in selecting advertisements in accordance with an embodiment of the present invention.

Turning to FIG. 8, a flow diagram is provided that illustrates a method 800 for identifying topics for a search query or web page in accordance with an embodiment of the present invention. As shown at block 802, a search query or identification of a web page is received. In accordance with the embodiment shown in FIG. 8, a determination is made at block 804 regarding whether an ontology mapping already exists for the search query or web page. For instance, the search query may be a top-end search query for which search system personnel have manually identified relevant topics for the search query. Alternatively, the received search query or web page may correspond with a search query or web page that has been previously processed to identify relevant topics, and the system may have cached the identified topics for the search query or web page. If it is determined that an ontology mapping already exists at block 806, topics for the search query or web page are retrieved at block 808. In some embodiments, only the topics retrieved at block 808 are used as candidate phrases for advertisement selection and the process ends. In other embodiments, the process continues at block 810, and additional topics are algorithmically identified.

If it is determined at block 806 that an ontology mapping does not exist for the search query or web page (or if the process continues after retrieving topics at block 808), the search query or web page is further analyzed in conjunction with an ontology of topics (or a collection of topic ontologies) to identify whether any topics from the ontology are relevant to the search query or web page, as shown at block 810. In embodiments in which a search query is received, search results and/or other content identified as relevant to the search query is compared to the ontology of topics to identify relevant topics. In embodiments in which a web page is identified, content of the web page and/or stored content identified as being relevant to the web page is compared to the ontology of topics to identify relevant topics.

Identifying a topic from the ontology of topics as being relevant to a search query or web page may be performed in a number of different manners within the scope of embodiments of the present invention. By way of example only and not limitation, in one embodiment, content associated with a search query or web page is converted to one or more feature vectors based on words contained in the content. Each feature vector is compared to topics in the ontology to determine distance of the feature vector to the topics. Positive topic identification may be based on determining that a feature vector is within a predetermined distance of a given topic. Analysis at block 810 may identify zero or more topics from the ontology of topics as being relevant to the search query or web page.

The search query or web page is compared to an ontology of partial topics (or a collection of partial topic ontologies) at block 812. As indicated above, a partial topic is a topic that is only partially-named. Each partial topic includes a partial topic identifier word that may be combined with an additional word or phrase to create a topic.

Identifying a partial topic from the ontology of partial topics as being relevant to a search query or web page may be performed in a number of different manners within the scope of embodiments of the present invention. By way of example only and not limitation, in one embodiment, content associated with a search query or web page is converted to one or more feature vectors based on words contained in the content. Each feature vector is compared to partial topics in the ontology to determine distance of the feature vector to the partial topics. Positive partial topic identification may be based on determining that a feature vector is within a predetermined distance of a given partial topic. Analysis at block 812 may identify zero or more partial topics from the ontology of partial topics as being relevant to the search query or web page.

Partial topics identified at block 812 are named, as shown at block 814. A flow diagram is provided in FIG. 9 that illustrates a method 900 for naming a partial topic in accordance with an embodiment of the present invention. As shown at block 902, occurrences of the partial topic identifier word within search results and/or content associated with the search query (in the case of a received search query) or content of the web page, and/or content identified as being relevant to the web page (in the case of an identified web page) are identified. For instance, the partial topic identifier word may be "reviews," and each occurrence of that term is identified. At block 904, one or more words and/or phrases around the partial topic identifier word are extracted. The frequency of each extracted word and/or phrase is counted, as shown at block 906. In some embodiments, the location of each extracted word and/or phrase with respect to the partial topic identifier word is tracked and counted. In particular, a word or phrase may appear before or after the partial topic identifier word. The system may separately track how many times each word and/or phrase appears before the partial topic identifier word and how many times each word and/or phrase appears after the partial topic identifier word.

After the search results and/or content have been analyzed, the most frequently used word or phrase is selected, as shown at block 908. Additionally, the partial topic is named using the partial topic identifier word and the most frequently used word or phrase, as shown at block 910. The sequencing of the partial topic identifier word and the most frequently used word or phrase may be determined based on the majority ordering in the analyzed text. For instance, if the selected word or phrase occurred before the partial topic identifier word more often than after the partial topic identifier word, the sequence for the partial topic name will include the selected word or phrase first followed by the partial topic identifier word.

Returning to FIG. 8, topics are identified by extracting key-phrases from search results and/or content relevant to a search query or from the content of an identified web page and/or other content relevant to the web page, as shown at block 816. Identifying key-phrase topics may be performed by computing independent key-phrases and selecting topics based on the independent key-phrases. The process at block 816 may result in zero or more key-phrase topics. Referring to FIG. 10, a flow diagram is provided that illustrates a method 1000 for computing independent key-phrases in accordance with an embodiment of the present invention. As shown at block 1002, candidate key-phrases are generated from search results and/or other content for a search query or from the content of an identified web page and/or other content relevant to the web page. In accordance with some embodiments of the present invention, a Markov chain based method is used to generate the candidate key-phrases.

Candidate key-phrases are evaluated for independence, as shown at block 1004. Independence of candidate key-phrases may be evaluated using a number of metrics in accordance with embodiments of the present invention. For instance, independence may be determined based on any combination of the following metrics: the number of words shared between the candidate key-phrases, analysis of acronyms of words in the key-phrases, and the number of documents shared by candidate key-phrases.

For each group of mutually dependent key-phrases, the mutually dependent key-phrases are merged at block 1006. As such, the most frequent key-phrase from a group of mutually dependent key-phrases is selected as a key-phrase for further analysis, as shown at block 1008. The process of merging mutually dependent key-phrases to identify key-phrases for further analysis is repeated until no more mutually dependent key-phrases remain. The result of the method 1000 is a collection of one or more independent key-phrases that may be further evaluated as possible topics.

Referring again to FIG. 8, a collection of candidate topics is provided as a result of the above-described process and may include topics identified from an existing ontology mapping, analysis of an ontology of topics, analysis of an ontology of partial topics, and/or key-phrase generation. In some instances, a larger number of topics may have been identified than is desired. As such, the process in some embodiments continues by ranking and selecting topics for further analysis. As shown at block 818, the candidate topics are ranked. Candidate topics may be ranked using a number of different factors in accordance with various embodiments of the present invention. By way of example only and not limitation, each candidate topic may be ranked based on the distance between features vectors to topics. A candidate topic may also be ranked based on the total number of content items identified as related to each candidate topic. A larger number of documents assigned to a given candidate topic may provide a higher ranking for the candidate topic. In the context of search, a candidate topic may also be ranked based on the ranking of each document (or a selection of documents—e.g., the top N documents) assigned to the candidate topic. The ranking of each document corresponds with each document's relevance to the search query. Accordingly, more highly relevant documents being assigned to a given candidate topic may provide a higher ranking for the candidate topic. The length (e.g., number of words) of each candidate topic may further be used to rank the candidate topics. Any and all such variations are contemplated to be within the scope of embodiments of the present invention.

As shown at block 820, topics are selected from the list of candidate topics based on ranking. In some embodiments, a predetermined number of topics is selected. For instance, the five topics with the highest ranking may be selected. In other embodiments, all topics having a ranking satisfying a predetermined or dynamic threshold may be selected. In further embodiments, topics having a significantly higher ranking than other topics are selected. Any combination of the above and/or additional approaches to selecting topics based on ranking may be employed within embodiments of the present invention.

Topics selected via the method 800 may be further processed to select advertisements as discussed hereinabove. Additionally, in some embodiments, a table of contents may be generated based on the selected topics. The table of contents may be included on a search results page that is generated in response to the search query. For instance, the table of contents may be presented in a side panel adjacent to the search results or in another portion of the search results page.

Figure 11A:
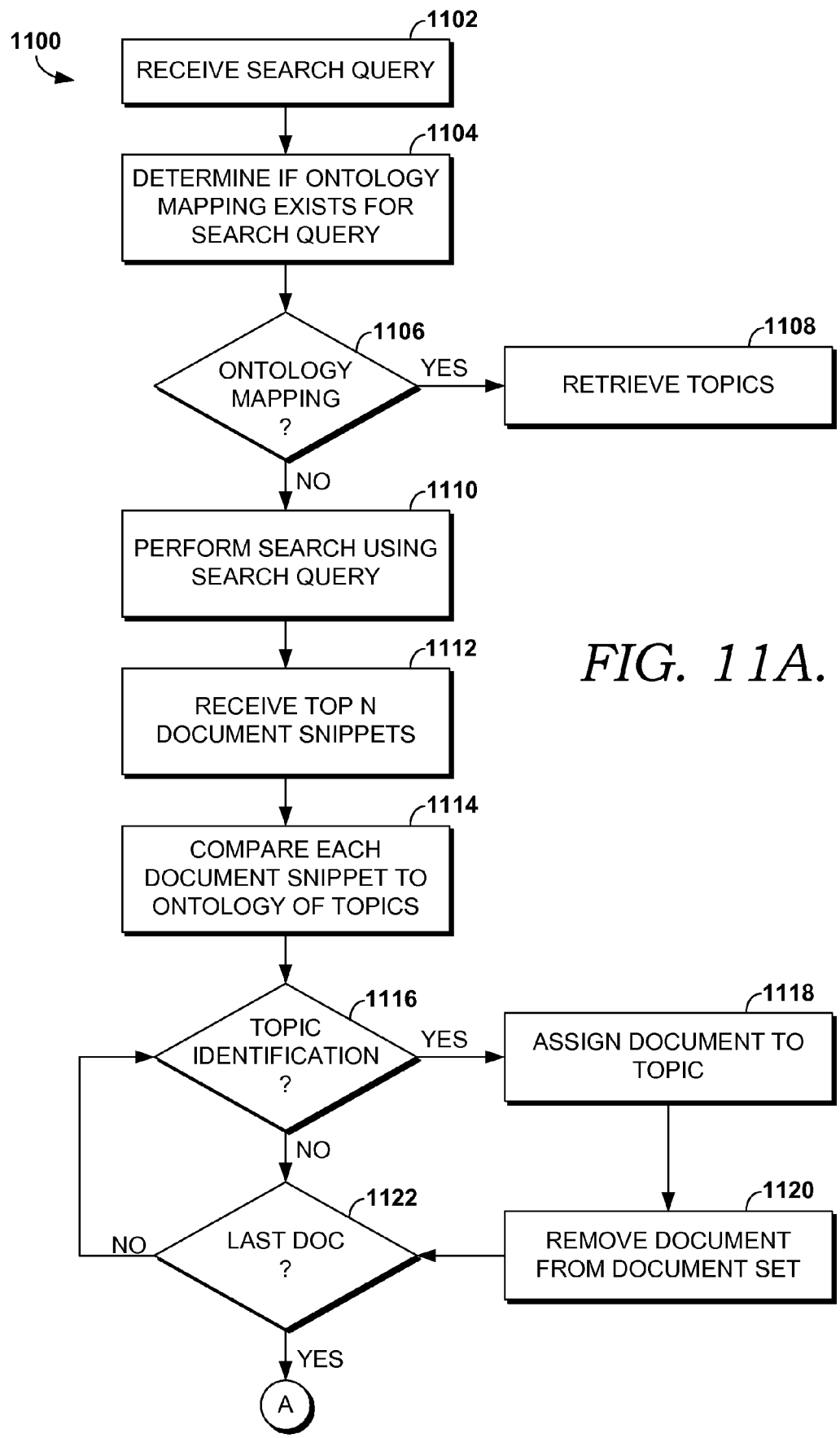
FIGS. 11A-11C include a flow diagram showing a method for determining topics for a search query for use in selecting advertisement in accordance with an embodiment of the present invention.
Figure 11B:
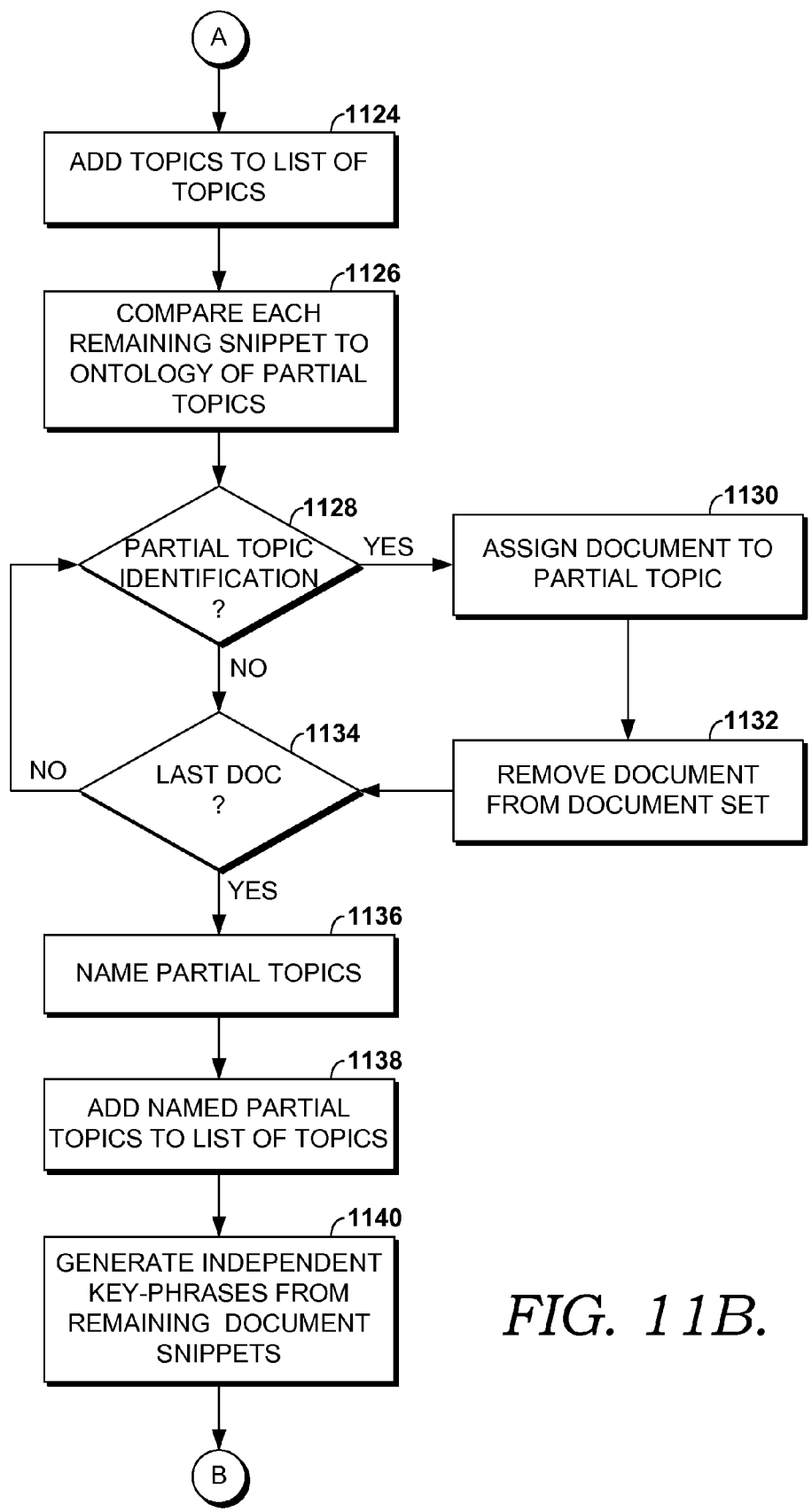
Figure 11C:
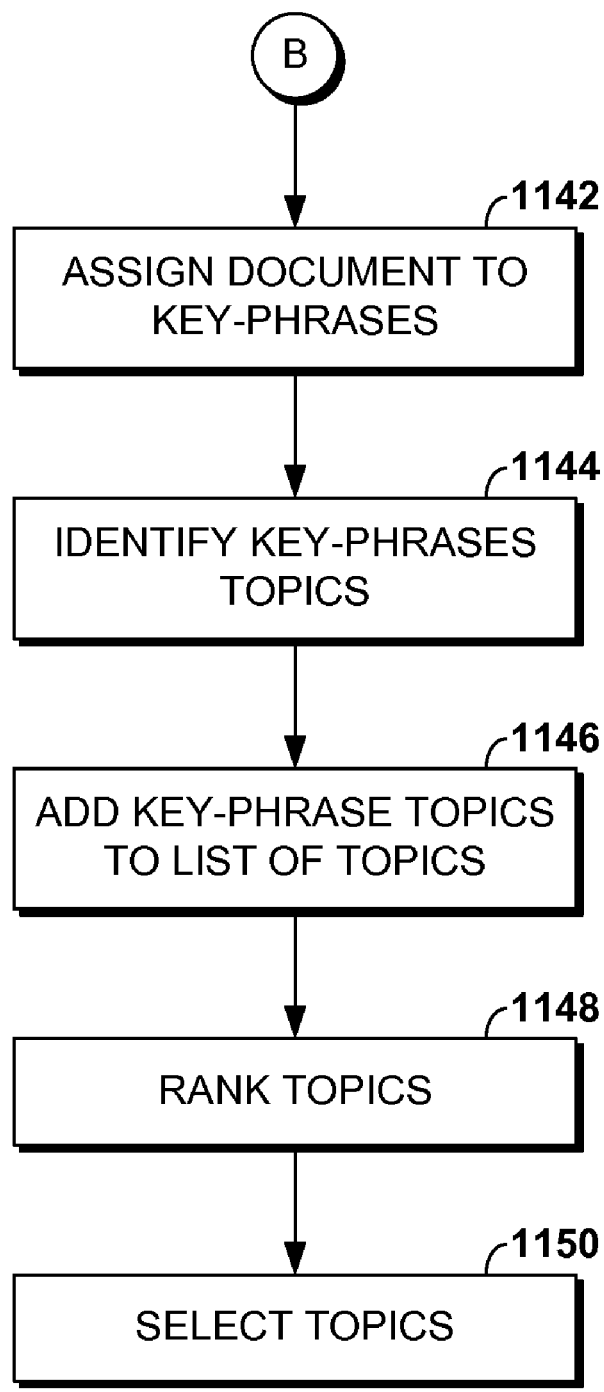

With reference now to FIG. 11, a flow diagram is provided that illustrates a method 1100 for identifying topics for a search query received at a search system in accordance with another embodiment of the present invention. As shown at block 1102, a search query is received. In accordance with the embodiment shown in FIG. 11, a determination is made at block 1104 regarding whether an ontology mapping already exists for the search query. For instance, the search query may be a top-end search query for which search system personnel have manually identified relevant topics for the search query. Alternatively, the received search query may correspond with a search query that has been previously processed by the search system to identify relevant topics, and the search system may have cached the identified topics for the search query. If it is determined that an ontology mapping already exists at block 1106, topics for the search query are retrieved at block 1108. In some embodiments, only the topics retrieved at block 1108 are used for advertisement selection and the process ends. In other embodiments, the process continues at block 1110, and additional topics are algorithmically identified.

If it is determined at block 1106 that an ontology mapping does not exist for the search query (or if the process continues after retrieving topics at block 1108), a search is performed using the search query, as shown at block 1110. Search results for the search query are returned, and the top N document snippets from the search are received at block 1112 as a document set to be analyzed.

As shown at block 1114, each document snippet in the document set is compared to an ontology of topics (or a collection of ontologies) to identify whether each document snippet maps to a topic in the ontology. Identifying a document snippet as being associated with a topic in the ontology of topics may be performed in a number of different manners within the scope of embodiments of the present invention. By way of example only and not limitation, in one embodiment, a document snippet is converted to a feature vector based on words contained in the document snippet, and the feature vector is compared to topics in the ontology to determine distance of the feature vector to the topics. Positive topic identification is determined for a given document snippet by determining that the feature vector for the document snippet is within a predetermined distance of a given topic. If topic identification is positive for a given document snippet at block 1116 based on analysis of the document snippet and ontology, the document snippet is assigned to the identified topic, as shown at block 1118. Additionally, the document snippet is removed from the document set at block 1120.

After identifying a relevant topic for a given document snippet (e.g., via blocks 1116-1120) or determining that no topic from the ontology is sufficiently relevant for the document snippet (e.g., via block 1116), a determination is made at block 1122 regarding whether the document snippet analyzed was the last document snippet in the document set to be analyzed. If additional document snippets remain for analysis, the process of blocks 1116-1122 is repeated until all document snippets in the document set have been compared to the ontology of topics. After all document snippets in the document set have been compared to the ontology of topics, topics identified from the ontology of topics are added to a list of candidate topics for consideration, as shown at block 1124. In some embodiments, all identified topics are added to the list. In other embodiments, only a portion of the topics are added. For instance, in some embodiments, only topics having a predetermined number of assigned document snippets are added to the list of topics.

As shown at block 1126, each remaining document snippet in the document set is compared to an ontology of partial topics (or a collection of ontologies). As indicated above, a partial topic is a topic that is only partially-named. Each partial topic includes a partial topic identifier word that may be combined with an additional word or phrase to create a topic.

Whether a given document snippet is associated with a partial topic in the ontology of partial topics is determined at block 1128. Identifying a document snippet as being associated with a partial topic may be performed in a number of different manners within the scope of embodiments of the present invention. By way of example only and not limitation, in one embodiment, a document snippet is converted to a feature vector based on words contained in the document snippet, and the feature vector is compared to partial topics in the ontology of partial topics to determine distance of the feature vector to the partial topics. Positive partial topic identification is determined for a given document snippet by determining that the feature vector for the document snippet is within a predetermined distance of a given partial topic. If partial topic identification is positive for a given document snippet at block 1128 based on analysis of the document snippet and the ontology of partial topics, the document snippet is assigned to the identified partial topic, as shown at block 1130. Additionally, the document snippet is removed from the document set at block 1132.

After identifying a relevant partial topic for a given document snippet (e.g., via blocks 1128-1132) or determining that no partial topic from the ontology is sufficiently relevant for a given document snippet (e.g., via block 1128), a determination is made at block 1134 regarding whether the document snippet analyzed was the last document snippet in the document set to be analyzed. If additional document snippets remain for analysis, the process of blocks 1128-1134 is repeated until all document snippets in the document set have been compared to the ontology of partial topics.

After each document snippet remaining in the document set has been compared against the ontology of partial topics, partial topics are named at block 1136. In some embodiments, all identified partial topics are named. In other embodiments, only a portion of the topics are named and others are not considered for further analysis. For instance, in some embodiments, only partial topics having a predetermined number of assigned document snippets are named and considered for further analysis. Partial topics may be named as discussed above with reference to FIG. 9. Named partial topics are added to the list of topics, as shown at block 1138.

Independent key-phrases are generated at block 1140 from the document snippets remaining in the document set after comparison of the documents snippets to the ontology of topics and the ontology of partial topics. Independent key-phrases may be generated as discussed above with reference to FIG. 10.

After identifying candidate topics from independent key-phrases, document snippets remaining in the document set are assigned to the key-phrase topics, as shown at block 1142. Identifying a document snippet as being associated with a key-phrase may be performed in a number of different manners within the scope of embodiments of the present invention. By way of example only and not limitation, in one embodiment, a document snippet is converted to a feature vector based on words contained in the document snippet, and the feature vector is compared to key-phrases to determine distance of the feature vector to the key-phrases. Positive key-phrase identification is determined for a given document snippet by determining that the feature vector for the document snippet is within a predetermined distance of a given key-phrase. Key-phrase topics are identified as shown at block 1144 and added to the list of topics at block 1146. In some embodiments, all independent key-phrases are identified as key-phrase topics and added to the list of topics. In other embodiments, only a portion of the key-phrases are recognized as topics are added to the list of topics. For instance, in some embodiments, only key-phrases having a predetermined number of assigned document snippets are identified as key-phrase topics and added to the list of topics.

A list of candidate topics is provided as a result of the above-described process and may include topics identified from an existing ontology mapping, analysis of an ontology of topics, analysis of an ontology of partial topics, and/or key-phrase generation. In some instances, a larger number of topics may have been identified than is desired. As such, the process in some embodiments continues by ranking and selecting topics for further analysis. As shown at block 1148, the candidate topics are ranked. Candidate topics may be ranked using a number of different factors in accordance with various embodiments of the present invention. By way of example only and not limitation, each candidate topic may be ranked based on the total number of documents assigned to each candidate topic. A larger number of documents assigned to a given candidate topic may provide a higher ranking for the candidate topic. A candidate topic may also be ranked based on the ranking of each document (or a selection of documents—e.g., the top N documents) assigned to the candidate topic. The ranking of each document corresponds with each document's relevance to the search query. Accordingly, more highly relevant documents being assigned to a given candidate topic may provide a higher ranking for the candidate topic. The length (e.g., number of words) of each candidate topic may further be used to rank the candidate topics. Any and all such variations are contemplated to be within the scope of embodiments of the present invention.

As shown at block 1150, topics are selected from the list of candidate topics based on ranking. In some embodiments, a predetermined number of topics is selected. For instance, the five topics with the highest ranking may be selected. In other embodiments, all topics having a ranking satisfying a predetermined or dynamic threshold may be selected. In further embodiments, topics having a significantly higher ranking than other topics are selected. Any combination of the above and/or additional approaches to selecting topics based on ranking may be employed within embodiments of the present invention.

Topics selected via the method 1100 may be further processed to select advertisements as discussed hereinabove. Additionally, in some embodiments, a table of contents may be generated based on the selected topics. The table of contents may be included on a search results page that is generated in response to the search query. For instance, the table of contents may be presented in a side panel adjacent to the search results or in another portion of the search results page.

Figure 12:
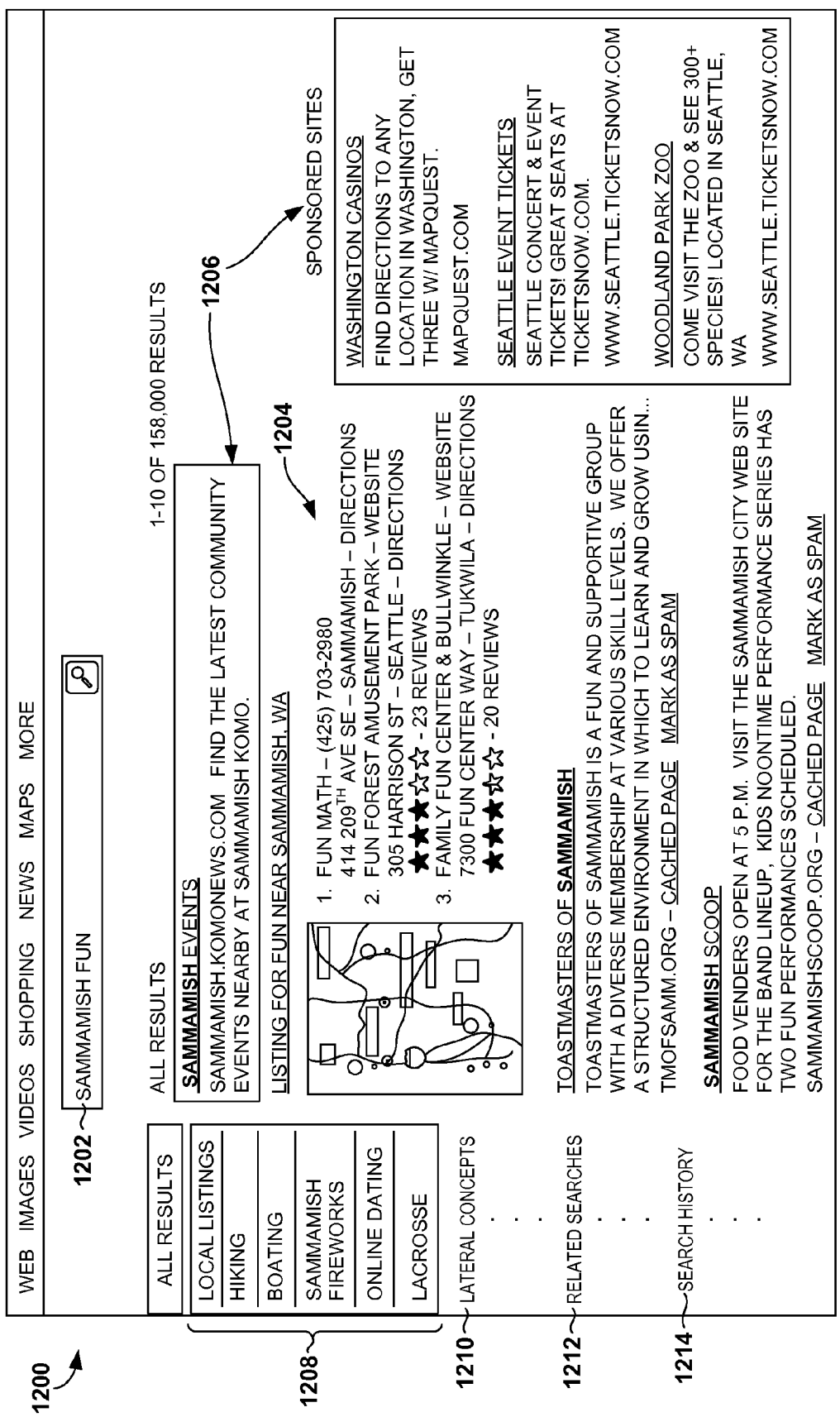
FIG. 12 is an illustrative screen display showing a search results page having advertisements selected in accordance with an embodiment of the present invention.
Figure 13:
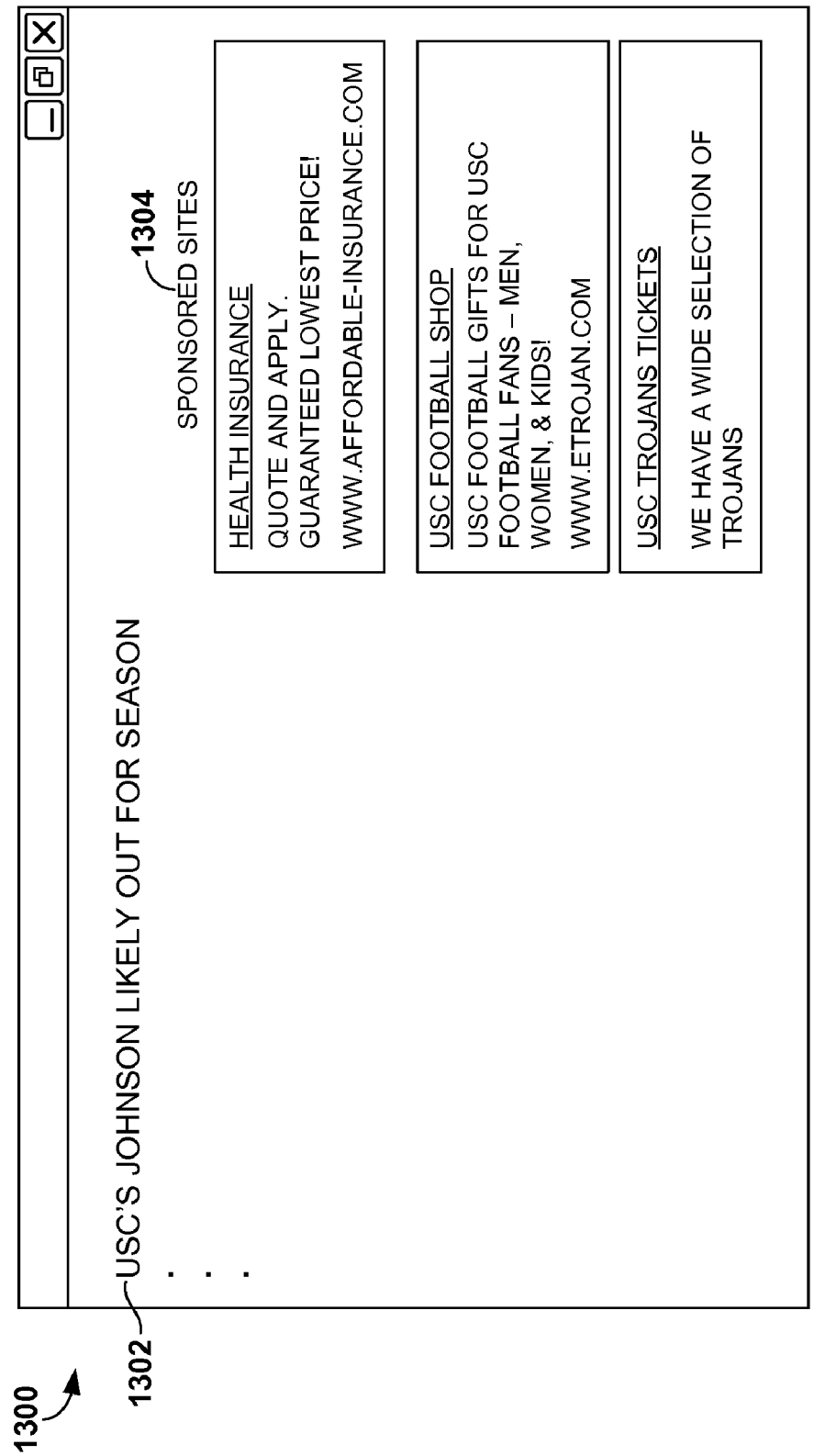
FIG. 13 is an illustrative screen display showing a web page having advertisements selected in accordance with an embodiment of the present invention.

By way of illustration, FIGS. 12 and 13 include exemplary screen displays showing presentation of advertisements selected in accordance with embodiments of the present invention. It will be understood and appreciated by those of ordinary skill in the art that the screen displays of FIGS. 12 and 13 are provided by way of example only and are not intended to limit the scope of the present invention in any way.

Referring initially to FIG. 12, an exemplary screen display is provided that shows a search results page 1200 including advertisement selected in accordance with an embodiment of the present invention. As shown in FIG. 12, the search results page 1200 has been provided in response to the search query 1202, "sammamish fun." In response to the search query 1202, the search results page 1200 includes a number of search results to the search query 1202 that are provided in a search results area 1204. Additionally, the search results page 1200 includes a left-side pane providing a table of contents 1208 listing topics identified for the search query and lateral concepts in a lateral concept area 1210 (specific lateral concepts have been omitted from the search results page 1200). In the screen display of FIG. 12, "All Results" are currently being displayed in the search results area 1204. If a user selects a topic from the table of contents 1208, search results relevant to the selected topic would be displayed in the search results area 1204. Alternatively, if a user selects a lateral concept from the lateral concept area 1210, content relevant to the selected lateral concept would be displayed in the search results area 1204. The search results page 1200 also includes advertisements 1206. In accordance with embodiments of the present invention, the advertisements have been selected using phrases based on the topics and lateral concepts. As shown in FIG. 12, the search results page 1200 may include further features, such as, for instance, related search queries 1212, and search history 1214. Details of these sections have been omitted from the search results page 1200.

Turning to FIG. 13, an exemplary screen display is provided that shows a web page 1300 including advertisement selected in accordance with an embodiment of the present invention. As shown in FIG. 13, the web page 1300 includes content 1302. In the present example, the content 1302 is a news story regarding an injury to a college football player. Note that the details of the news story have been omitted from the web page 1300 in FIG. 13. The web page 1300 also includes a number of advertisements 1304 that have been selected based on lateral concepts and topics identified from the content 1302 in accordance with embodiments of the present invention.

As can be understood, embodiments of the present invention provide for the selection and delivery of advertisements on search result pages and web pages based on lateral concepts and topics identified based on analysis of search queries and web pages. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media storing computer-useable instructions that, when used by one or more computing devices, cause the one or more computing devices to perform a method comprising:

receiving a search query or an indication of a web page;

identifying one or more lateral concepts based on content identified as being relevant to the search query or content of the web page, wherein each lateral concept is identified as a candidate phrase for advertisement selection purposes;

identifying one or more topics based on the search query or the content of the web page, wherein each topic is identified as a candidate phrase for advertisement selection purposes in accordance with the following:

determining if an ontology mapping exists for the search query, wherein the ontology mapping includes a query similar to the search query and a first set of topics that were previously identified as relevant;

if an ontology mapping exists for the search query, retrieving the first set of topics based on the ontology mapping and adding the first set of topics to a list of topics;

if an ontology mapping does not exist for the search query, performing a search using the search query to obtain a plurality of search results, each search result corresponding with a document snippet;

receiving at least a portion of the document snippets as a document set for further analysis;

comparing each document snippet in the document set to an ontology of topics;

for each document snippet in which positive topic identification is determined based on the comparison between the document snippet and the ontology of topics, assigning the document snippet to one or more corresponding topics from the ontology of topics having positive topic identification with the document snippet, removing the document snippet from the document set, and adding at least one or more of the corresponding topics identified from the ontology of topics to the list of topics;

comparing each document snippet remaining in the document set to an ontology of partial topics, wherein the document set does not include each document snippet having positive topic identification with the ontology of topics;

for each remaining document snippet in which positive partial topic identification is determined based on the comparison between the document snippet and the ontology of partial topics, assigning the document snippet to one or more corresponding partial topics, removing the document snippet from the document set, naming at least one or more corresponding partial topics having one or more assigned document snippets;

and adding at least one or more named partial topics to the list of topics;

computing independent key-phrases from document snippets remaining in the document set, wherein the document set does not include each document snippet having positive topic identification with the ontology of topics and each document snippet having positive partial topic identification with the ontology of partial topics, assigning documents to independent key-phrases, identifying at least one key-phrase topic, and adding the at least one key-phrase topic to the list of topics;

selecting one or more phrases from the identified candidate phrases;

querying an advertisement inventory using the one or more selected phrases to select one or more advertisements; and providing the one or more advertisements for presentation to a user.

2. The one or more computer-readable media of claim 1, wherein identifying one or more lateral concepts comprises:

obtaining a first set of content from storage that corresponds to the search query or content of the web page;

identifying a plurality of categories associated with the obtained first set of content;

and selecting a subset of the plurality of identified categories as lateral concepts.

3. The one or more computer-readable media of claim 1, wherein identifying one or more lateral concepts comprises:

calculating similarity between content in storage and the search query or the content of the web page;

creating a collection of content having a predetermined number of content similar to the search query or the content of the web page;

identifying a plurality of categories that correspond to content in the collection of content; and selecting several identified categories as lateral concepts.

4. The one or more computer-readable media of claim 1, wherein naming a partial topic comprises:

identifying occurrences of a partial topic identifier word for the partial topic within one or more document snippets assigned to the partial topic;

extracting words and/or phrases occurring around identified occurrences of the partial topic identifier word within the one or more document snippets;

counting frequency of each extracted word and/or phrase;

selecting a most frequently used word or phrase;
and naming the partial topic using the partial topic identifier and the most frequently used word or phrase.

5. The one or more computer-readable media of claim 4, wherein counting frequency of each extracted word and/or phrase comprises tracking position of each extracted word and/or phrase relative to the partial topic identifier word, and wherein naming the partial topic comprises sequencing the partial topic identifier word and the most frequently used word or phrase based on position information for the most frequently used word or phrase.

6. The one or more computer-readable media of claim 1, wherein computing independent key-phrases from document snippets remaining in the document set comprises:
generating candidate key-phrases from the document snippets remaining in the document set;
evaluating candidate key-phrases for independence;
merging mutually dependent candidate key-phrases; and
identifying a most frequent candidate key-phrase for each group of merged mutually dependent key-phrases.

7. The one or more computer-readable media of claim 1, wherein selecting one or more phrases from the candidate phrases comprises:
ranking each candidate phrase based on an estimate of an extent to which each candidate phrase will produce advertising revenue;
and selecting the one or more phrases based on ranking.

8. The one or more computer-readable media of claim 1, wherein querying the advertisement inventory using the one or more selected phrases to select one or more advertisements comprises performing an auction process to select the one or more advertisements based on relevance of each advertisement to the one or more phrases and based on monetization factors associated with each advertisement.

9. The one or more computer-readable media of claim 1, wherein a search query is received, and wherein providing the one or more advertisements for presentation to the user comprises providing the one or more advertisements for presentation on a search results page including search results in response to the search query.

10. The one or more computer-readable media of claim 9, wherein the search results page includes the one or more lateral concepts allowing the user to access content associated with the one or more lateral concepts.

11. The one or more computer-readable media of claim 10, wherein the search results page includes the one or more topics in a table of contents allowing the user to select a topic from the one or more topics to view content associated with the selected topic.

12. The one or more computer-readable media of claim 1, wherein an indication of a web page is received, and wherein providing the one or more advertisements for presentation to the user comprises providing the one or more advertisements for presentation on the web page.

13. One or more computer-readable media storing computer-useable instructions that, when used by one or more computing devices, cause the one or more computing devices to perform a method comprising:
receiving a search query;
performing a search using the search query to identify content from storage that corresponds with the search query;
identifying a plurality of categories associated with the obtained content;
selecting a subset of the plurality of identified categories as lateral concepts, wherein the lateral concepts are identified as candidate phrases for advertisement selection;
receiving a plurality of documents snippets from the search;
identifying a first set of one or more candidate topics by comparing one or more document snippets to an ontology of topics;
identifying a second set of one or more candidate topics by comparing one or more document snippets to an ontology of partial topics;
identifying a third set of one or more candidate topics by generating key-phrase topics from one or more document snippets;
selecting topics from the first, second, and third set of candidate topics as candidate phrases for advertisement selection;
selecting one or more phrases from the identified candidate phrases;
querying an advertisement inventory using the one or more selected phrases to select one or more advertisements; and
providing the one or more advertisements for presentation to a user.

14. The one or more computer-readable media of claim 13, wherein identifying the third set of one or more candidate topics by generating key-phrase topics from one or more document snippets includes computing independent key-phrases from document snippets remaining in the document set by:
generating candidate key-phrases from one or more document snippets using a Markov chain based method;
evaluating candidate key-phrases for independence;
merging mutually dependent candidate key-phrases; and
identifying a most frequent candidate key-phrase for each group of merged mutually dependent key-phrases.

15. The one or more computer-readable media of claim 13, wherein providing the one or more advertisements for presentation to the user comprises providing the one or more advertisements for presentation on a search results page including search results in response to the search query.

16. The one or more computer-readable media of claim 15, wherein the search results page includes the lateral concepts allowing the user to access content associated with the lateral concepts.

17. The one or more computer-readable media of claim 15, wherein the search results page includes the topics in a table of contents allowing the user to select a topic from the table of contents to view search results associated with the selected topic.

* * * * *